United States Patent
Minagawa et al.

(10) Patent No.: US 9,542,758 B2
(45) Date of Patent: Jan. 10, 2017

(54) IMAGE PROCESSING APPARATUS AND LIGHT SOURCE IDENTIFICATION METHOD

(71) Applicant: FUJITSU LIMITED, Kawasaki-shi, Kanagawa (JP)

(72) Inventors: Akihiro Minagawa, Tachikawa (JP); Yasumasa Iwamura, Akashi (JP); Hiroyuki Kobayashi, Kawasaki (JP); Satoru Ushijima, Kawasaki (JP); Yusuke Uehara, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/800,321

(22) Filed: Jul. 15, 2015

(65) Prior Publication Data

US 2016/0027190 A1 Jan. 28, 2016

(30) Foreign Application Priority Data

Jul. 25, 2014 (JP) ................. 2014-151772

(51) Int. Cl.
*G06K 9/00* (2006.01)
*G06T 7/40* (2006.01)
(Continued)

(52) U.S. Cl.
CPC ............ *G06T 7/408* (2013.01); *G06K 9/6212* (2013.01); *G06T 5/001* (2013.01); *H04N 9/045* (2013.01); *G06T 2207/10024* (2013.01)

(58) Field of Classification Search
CPC .................... H04N 1/60; H04N 9/3182; G06T 2207/10024; G06T 15/506; G06T 7/408
See application file for complete search history.

(56) References Cited

U.S. PATENT DOCUMENTS 6,075,563 A 6/2000 Hung
2004/0135899 A1* 7/2004 Suemoto ................ H04N 9/735
348/223.1

(Continued)

FOREIGN PATENT DOCUMENTS

JP 5-103336 4/1993
JP 10-004558 1/1998
(Continued)

OTHER PUBLICATIONS

Daisuke Nakao et al., "Real-time Multi-spectral Image Processing for Mapping Pigmentation in Human Skin", Medical Imaging Technology vol. 20 No. 2, Mar. 2002, pp. 123-133, with English translation (23 pages).

(Continued)

*Primary Examiner* — Eueng-Nan Yeh
(74) *Attorney, Agent, or Firm* — Fujitsu Patent Center

(57) ABSTRACT

An image processing apparatus is provided including a storage unit for storing relationships of color coordinates between a plurality of reference colors under each of a plurality of different light sources for each light source, with respect to the plurality of reference colors set in a color space and being different from one another; and a calculation unit for detecting color coordinates of the plurality of reference colors from an object image to be processed, and identifying a light source used in capturing of the object image according to a similarity between relationships of the detected color coordinates and the relationships of color coordinates stored in the storage unit for each light source.

11 Claims, 23 Drawing Sheets

(51) Int. Cl.
*G06T 5/00* (2006.01)
*H04N 9/04* (2006.01)
*G06K 9/62* (2006.01)

(56) References Cited

U.S. PATENT DOCUMENTS

| | | | |
|---|---|---|---|
| 2006/0092444 A1 | 5/2006 | Nakamura et al. | |
| 2010/0157334 A1* | 6/2010 | Oobayashi | H04N 1/6088 358/1.9 |
| 2012/0176063 A1* | 7/2012 | Hatley | H05B 33/0863 315/297 |
| 2015/0009226 A1 | 1/2015 | Minagawa et al. | |

FOREIGN PATENT DOCUMENTS

| | | |
|---|---|---|
| JP | 2000-048179 | 2/2000 |
| JP | 2001-258047 | 9/2001 |
| JP | 2004-23207 | 1/2004 |
| JP | 2006-93770 | 4/2006 |
| JP | 2006-129263 | 5/2006 |
| JP | 2006-254309 | 9/2006 |
| WO | 2013/145295 | 10/2013 |

OTHER PUBLICATIONS

Tetsuya Kuno et al., "A Measurement Method for Spectral Responsivity of Digital Cameras", ITE Technical Report vol. 22 No. 73, Dec. 1998, pp. 13-18, with English translation (18 pages).

* cited by examiner

FIG. 4

(EXAMPLE OF REFERENCE COLOR TABLE 111a)

| No. | R | G | B |
|-----|-----|-----|-----|
| #1 | 120 | 100 | 200 |
| #2 | 200 | 50 | 150 |
| ⋮ | ⋮ | ⋮ | ⋮ |

FIG. 5
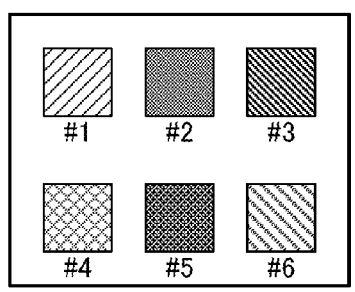
(COLOR CHART)
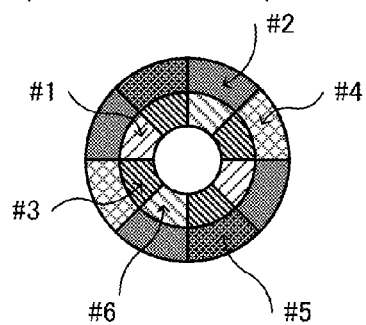
(CIRCULAR PATCH)
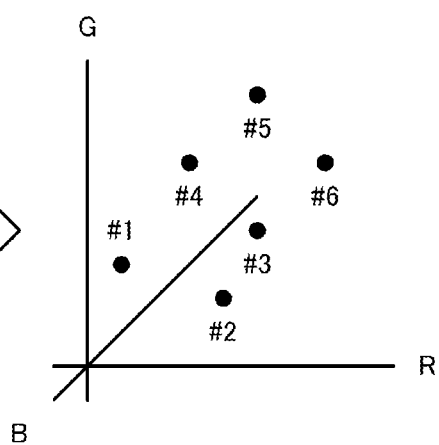
(COLOR COORDINATES)

FIG. 6

(EXAMPLE OF CORRECTION COLOR TABLE 111b)

| No. | LIGHT SOURCE #1 | | | LIGHT SOURCE #2 | | |
|---|---|---|---|---|---|---|
| | R | G | B | R | G | B |
| #5 | 122 | 100 | 200 | 120 | 104 | 199 |
| #6 | 199 | 50 | 145 | 204 | 49 | 140 |
| ⋮ | ⋮ | ⋮ | ⋮ | ⋮ | ⋮ | ⋮ |

FIG. 9

(EXAMPLE OF ERROR TABLE 111c)

| COLOR COORDINATES | | | CORRECTION ERROR (ADJUSTMENT VALUE) | | | | | |
|---|---|---|---|---|---|---|---|---|
| | | | LIGHT SOURCE #1 | | | LIGHT SOURCE #2 | | |
| R | G | B | dR | dG | dB | dR | dG | dB |
| 0 | 0 | 0 | −1 | −2 | −2 | −1 | −1 | −2 |
| 0 | 0 | 1 | −1 | −2 | −2 | −1 | −3 | −2 |
| 0 | 0 | 2 | −2 | −2 | −2 | −3 | −2 | −1 |
| ⋮ | ⋮ | ⋮ | ⋮ | ⋮ | ⋮ | ⋮ | ⋮ | ⋮ |
| 255 | 255 | 253 | 1 | 1 | 0 | 1 | 0.5 | 0 |
| 255 | 255 | 254 | 0 | 0 | 1 | 0 | 0 | 1 |
| 255 | 255 | 255 | 0 | 1 | 1 | 0 | 1.5 | 1 |

FIG. 20

(REFERENCE COLOR FEATURE TABLE 201)

|  | COLOR FEATURE CZ1 | COLOR FEATURE CZ2 | COLOR FEATURE CZ3 |
|---|---|---|---|
| LIGHT SOURCE #1 | (30, 0, 0) | (0, 30, 0) | (0, 0, 30) |
| LIGHT SOURCE #2 | (27, 5, 0) | (0, 28, 3) | (0, 8, 25) |
| LIGHT SOURCE #3 | (27, −5, 0) | (0, 25, −7) | (0, −5, 27) |

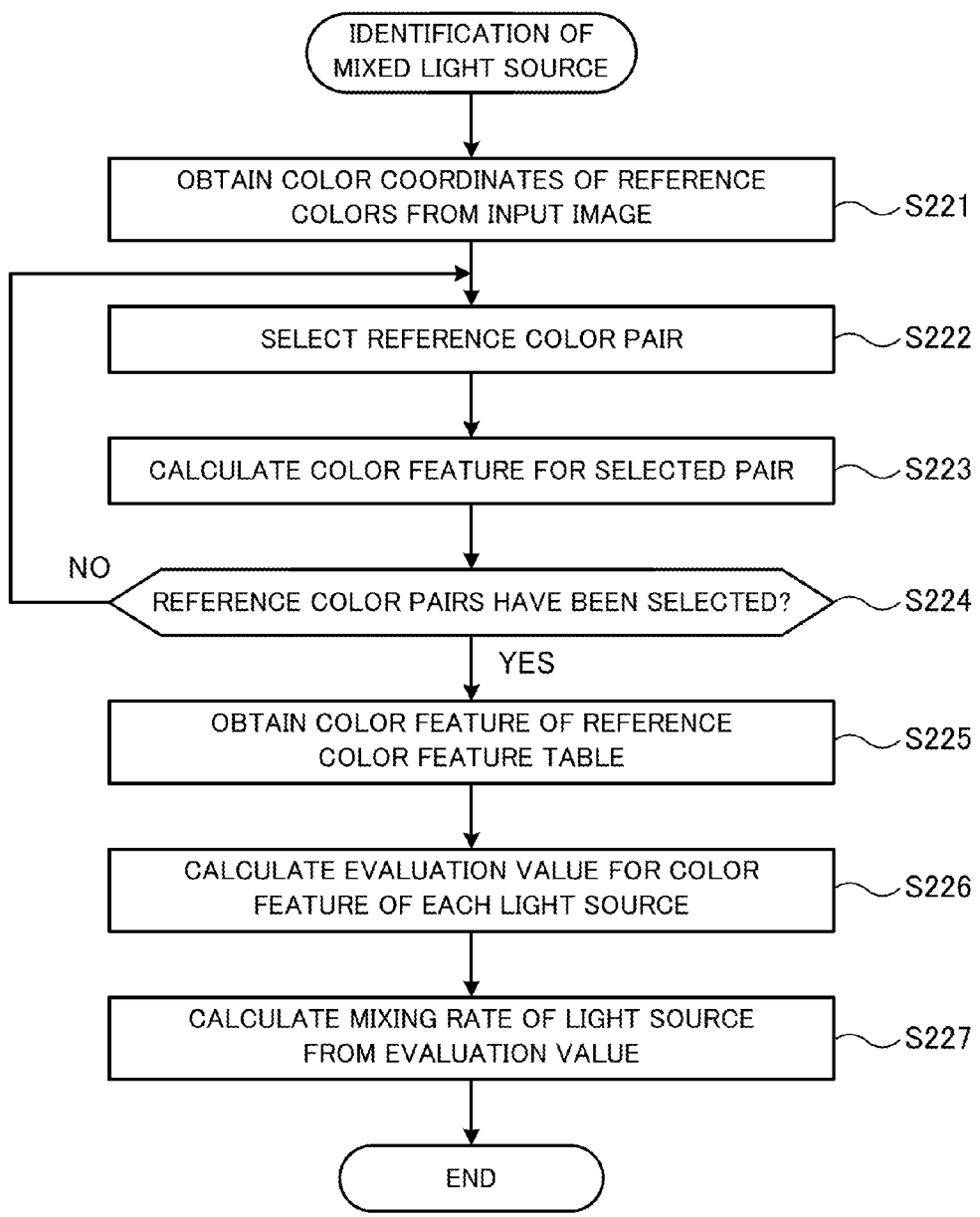

IMAGE PROCESSING APPARATUS AND LIGHT SOURCE IDENTIFICATION METHOD

CROSS-REFERENCE TO RELATED APPLICATION

This application is based upon and claims the benefit of priority of the prior Japanese Patent Application No. 2014-151772, filed on Jul. 25, 2014, the entire contents of which are incorporated herein by reference.

FIELD

The embodiments discussed herein relate to an image processing apparatus and a light source identification method.

BACKGROUND

When the color of a photographed image is shifted from an original color, there is performed processing to convert the color of each pixel in the image into the original color. This processing is called color correction. Methods of realizing the color correction include a method of photographing a sample containing a known color (hereinafter, called reference color) together with an object at the same time, for example, and converting the color of each pixel into an original color according to the change of the reference color.

However, the number of colors which each pixel of the image may take is huge, and it is difficult to set all the possible colors to the reference colors and to preliminarily convert each of the reference colors into an original color. Therefore, when the above method is applied, the processing of obtaining conversion for the color of each pixel (hereinafter, input color) from conversion for the reference color is performed by interpolation processing of obtaining the input color from preliminarily provided reference colors, and the color correction is performed for the input color according to the obtained conversion.

For example, there is a method of converting the input color by volume interpolation. This method sets a solid having reference colors at apexes in a color space, and obtains the conversion of the input color utilizing the conversion of the reference colors which are the apexes of the solid including the input color. When this method is applied, the accuracy of the color correction becomes better as the distances between the reference colors used in the correction processing and the input color are smaller. Accordingly, as a method of improving the accuracy in the color correction, there has been proposed a method of photographing a large number of reference colors so as to allow many solids to be set in the color space.

Japanese Laid-open Patent Publication No. 2000-48179

The above method by the volume interpolation converts the input color by the linear interpolation utilizing a relationship between the coordinates of the reference colors in the color space and the coordinates of the input color. Therefore, the interpolation processing according to this method does not use information except the coordinates in the color space.

The relationship between the reference color and the input color depends on environment such as the kind of a light source used in image capturing (e.g., sun light, fluorescent light, incandescent light bulb, or the like), for example. When the spectrum distribution characteristic (spectrum) of a light source, the reflection characteristic of an object, or the spectral sensitivity characteristic of an imaging element is changed, for example, and a pair of same colors is captured, the relationship between the colors obtained from the captured image is changed.

By such an environment change, an error may be caused in the color correction when the method by the above volume interpolation is applied. However, the influence of the change in the reflection characteristic of the object or the spectral sensitivity characteristic of the imaging element is smaller than the influence of the change in the spectrum distribution characteristic of the light source. Accordingly, identifying the light source in the image capturing increases the possibility of achieving a highly accurate color correction that is performed according to the light source.

SUMMARY

According to an aspect, an image processing apparatus is provided including a memory configured to store relationships of color coordinates between a plurality of reference colors under each of a plurality of different light sources for each light source, with respect to the plurality of reference colors set in a color space and being different from one another; and a processor configured to detect color coordinates of the plurality of reference colors from an object image to be processed, and to identify a light source used in capturing of the object image, according to a similarity between relationships of the detected color coordinates and the relationships of color coordinates stored for each light source in the memory.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 illustrates an example of a reference color table according to the second embodiment;

FIG. 5 explains a reference color;

FIG. 6 illustrates an example of a correction color table according to the second embodiment;

FIG. 9 illustrates an example of an error table according to the second embodiment;

FIG. 20 illustrates an example of a reference color feature table according to a third embodiment;

FIG. 23 is a flowchart illustrating a processing flow of identification of mixed light source according to the third embodiment.

DESCRIPTION OF EMBODIMENTS

Figure 1:
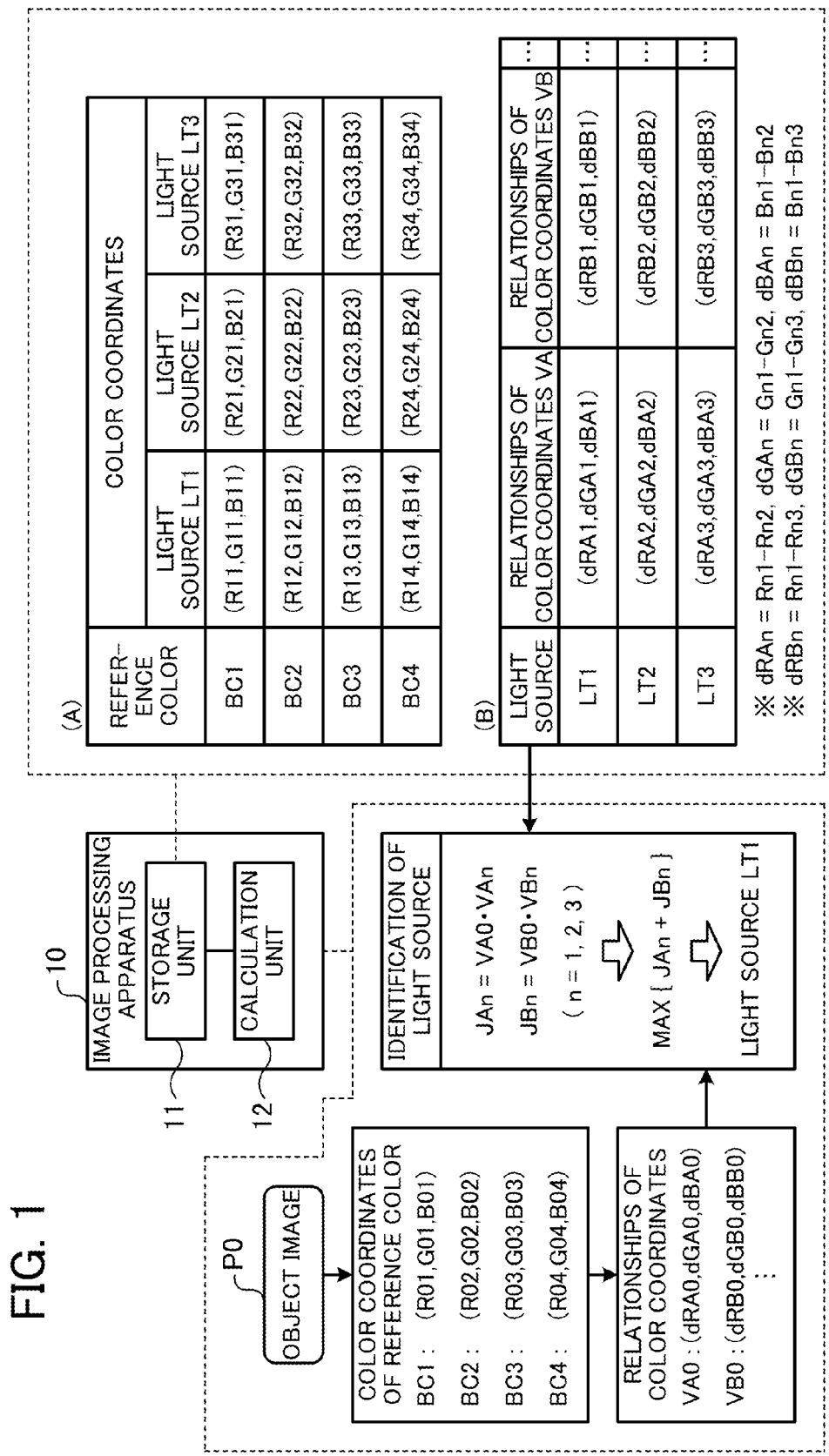
FIG. 1 illustrates an example of an image processing apparatus according to a first embodiment.

Several embodiments will be described below with reference to the accompanying drawings, wherein like reference numerals refer to like elements throughout.

<1. First Embodiment>

With reference to FIG. 1, a first embodiment will be explained. FIG. 1 illustrates an example of an image processing apparatus according to the first embodiment. Note that an image processing apparatus 10 illustrated in FIG. 1 is an example of the image processing apparatus according to the first embodiment.

As illustrated in FIG. 1, the image processing apparatus 10 includes a storage unit 11 and a calculation unit 12.

Here, the storage unit 11 is a volatile storage apparatus such as a RAM (Random Access Memory) or a non-volatile storage apparatus such as an HDD (Hard Disk Drive) and a flash memory. The calculation unit 12 is a processor such as a CPU (Central Processing Unit) and a DSP (Digital Signal Processor). Note that the calculation unit 12 may be an electronic circuit such as an ASIC (Application Specific Integrated Circuit) and an FPGA (Field Programmable Gate Array). The calculation unit 12 executes a program stored in the storage unit 11 or another memory, for example.

With respect to reference colors BC1, BC2, BC3 and BC4 set in a color space and being different from one another, the storage unit 11 stores relationships VA and VB of color coordinates between the reference colors BC1, BC2, BC3 and BC4 under each of different light sources LT1, LT2 and LT3 for each light source. Here, the HSV space, the YUV space or the like may be applied to the color space in addition to the RGB space.

A table (A) in FIG. 1 exemplifies color coordinate information obtained from images captured by photographing the reference colors BC1, BC2, BC3 and BC4 under the different light sources LT1, LT2 and LT3. For example, the color coordinates obtained from an image captured by photographing the reference color BC1 under the light source LT1 are (R11, G11, B11). For example, R11 takes a value of 100, G11 takes a value of 50, B11 takes a value of 0, and the like. Further, the light sources LT1, LT2 and LT3 are sun light (D65 light source), fluorescent light (F light source), and a light bulb (A light source), respectively, for example.

Further, a table (B) in FIG. 1 exemplifies the relationships VA and VB of color coordinates. The relationship VA of color coordinates expresses a vector in the color space extending from the color coordinates of the reference color BC1 to the color coordinates of the reference color BC2 with respect to the same light source. Further, the relationship VB of color coordinates expresses a vector in the color space extending from the color coordinates of the reference color BC1 to the color coordinates of the reference color BC3 with respect to the same light source.

As an example of the relationship VA of color coordinates, the table (B) illustrates a vector VA1 (VA1=(dRA1, dGA1, dBA1)) connecting the two color coordinates (R11, G11, B11) and (R12, G12, B12). VA1 corresponds to the light source LT1. Similarly, the table (B) illustrates VA2 (VA2= (dRA2, dGA2, dBA2)) corresponding to the light source LT2, and VA3 (VA3=(dRA3, dGA3, dBA3)) corresponding to the light source LT3.

Further, as an example of the relationship VB of color coordinates, the table (B) illustrates VB1 (VB1=(dRB1, dGB1, dBB1)) corresponding to the light source LT1. Further, the table (B) illustrates VB2 (VB2=(dRB2, dGB2, dBB2)) corresponding to the light source LT2, and VB3 (VB3=(dRB3, dGB3, dBB3)) corresponding to the light source LT3. For example, dRA1 takes a value of 0, dGA1 takes a value of 30, dBA1 takes a value of 0, and the like.

Here, another relationship of color coordinates other than VA and VB may be prepared. Further, the length of the vector VA1 or the like may be normalized to a certain length. Moreover, information except the vector connecting the two color coordinates may be employed as a relationship of color coordinates if the information expresses a positional relationship of the reference colors BC1, BC2, BC3 and BC4. For example, it is possible to employ any information expressing a solid shape having the reference colors BC1, BC2, BC3 and BC4 at the apexes.

The calculation unit 12 detects the color coordinates of the reference colors BC1, BC2, BC3 and BC4 from an object image P0 to be processed. Further, the calculation unit 12 calculates similarities JAn and JBn (n=1, 2 and 3) between the relationships VA and VB of the detected color coordinates and the relationships VA and VB of color coordinates stored in the storage unit 11 for each light source.

The example of FIG. 1 detects the color coordinates (R01, G01, B01) of the reference color BC1, the color coordinates (R02, G02, B02) of the reference color BC2, the color coordinates (R03, G03, B03) of the reference color BC3, and the color coordinates (R04, G04, B04) of the reference color BC4.

The calculation unit 12 calculates a relationship VA0 (VA0=(dRA0, dGA0, dBA0)) of color coordinates using the color coordinates (R01, G01, B01) of the reference color BC1 and the color coordinates (R02, G02, B02) of the reference color BC2. Further, the calculation unit 12 calculates a relationship VB0 (VB0=(dRB0, dGB0, dBB0)) of color coordinates using the color coordinates (R01, G01, B01) of the reference color BC1 and the color coordinates (R03, G03, B03) of the reference color BC3.

Next, the calculation unit 12 calculates a similarity JA1 between the relationships VA0 and VA1 of color coordinates, a similarity JA2 between the relationships VA0 and VA2 of color coordinates, and a similarity JA3 between the relationships VA0 and VA3 of color coordinates. Further, the calculation unit 12 calculates a similarity JB1 between the relationships VB0 and VB1 of color coordinates, a similarity JB2 between the relationships VB0 and VB2 of color coordinates, and a similarity JB3 between the relationships VB0 and VB3 of color coordinates.

The example of FIG. 1 expresses the inner product of VA0 and VAn (n=1, 2, 3) as a similarity JAn, and expresses the inner product of VB0 and VBn as a similarity JBn. In this case, the similarity JAn takes a larger value as VA0 and VAn are more similar to each other, and the similarity JBn takes a larger value as VB0 and VBn are more similar to each other.

In the case of this example, the calculation unit 12 compares (JAn+JBn) for n=1, 2, 3, and detects a value of n where (JAn+JBn) becomes maximum. The value of n corresponds to the kind of the light source. That is, the calculation unit 12 identifies the light source in the capturing of the object image P0 by this processing. For example, when (JAn+JBn) becomes maximum at n=1, the light source LT1 is identified as the light source in the capturing of the object image P0.

Note that it is also possible to employ an evaluation value based on an absolute value difference of the vectors from each other, as the similarity JAn or JBn. Since the absolute value difference becomes a smaller value as the similarity becomes higher, a reciprocal or the like of the absolute value difference may be employed as the evaluation value, for example. Also in this case, similarly to the above, the calculation unit 12 detects a value of n where the similarity (JAn+JBn) becomes maximum, and identifies the light source in the capturing of the object image P0.

By employing the above method, it becomes possible to identify a light source according to a detection result of the reference colors used in the color correction of the object image P0, for example. Further, by identifying the light source, it becomes possible to adjust a correction amount applied in color correction depending on the kind of the light source, and to improve the color correction accuracy when adjustment values are prepared for each light source.

Note that, while the vector connecting color coordinates is illustrated as the relationship of color coordinates in FIG. 1 and in the above explanation, the technical application range according to the first embodiment is not limited thereto.

For example, with respect to another reference color different from the reference colors BC1, BC2, BC3 and BC4, the storage unit 11 may store the color coordinates of another reference color obtained by the linear interpolation from the color coordinates of the reference colors BC1, BC2, BC3 and BC4 observed under the light source LT1, as a relationship of color coordinates. Similarly, the storage unit 11 may store the color coordinates of the another reference color obtained by the linear interpolation from the color coordinates of the reference colors BC1, BC2, BC3 and BC4 observed under each of the light sources LT2 and LT3, as a relationship of color coordinates.

In the above case, the calculation unit 12 obtains the color coordinates of another reference color by the linear interpolation from the reference colors BC1, BC2, BC3 and BC4 obtained from the object image P0, and compares the obtained color coordinates with the color coordinates of the another reference color stored in the storage unit 11. In this case, it is possible to use an evaluation value based on the distance between the color coordinates (e.g., reciprocal of the distance) or the like as a similarity. By such a mechanism, the calculation unit is able to identify a light source according to the similarity.

By employing the above method, it becomes possible to identify a light source according to a detection result of the reference colors used in the color correction of the object image P0, for example. Further, since a light source is identified, it becomes possible to adjust a correction amount applied in the color correction depending on the kind of the light source, and to improve the color correction accuracy when the adjustment values are prepared for each of the light sources.

In the above, the first embodiment has been explained.

<2. Second Embodiment>

Next, a second embodiment will be explained.

The second embodiment relates to a color correction technique of imaging a sample including reference colors having known color coordinates together with an object to be imaged, and correcting a color included in the captured image from how the reference colors are shifted in the captured image. Further, the second embodiment proposes a method of suppressing a correction error which is caused by a light source difference. In the following, taking an image processing apparatus 100 as an example of an apparatus capable of realizing this method, hardware, functions, and the like of the image processing apparatus 100 will be explained sequentially.

(2-1. Hardware)

Figure 2:
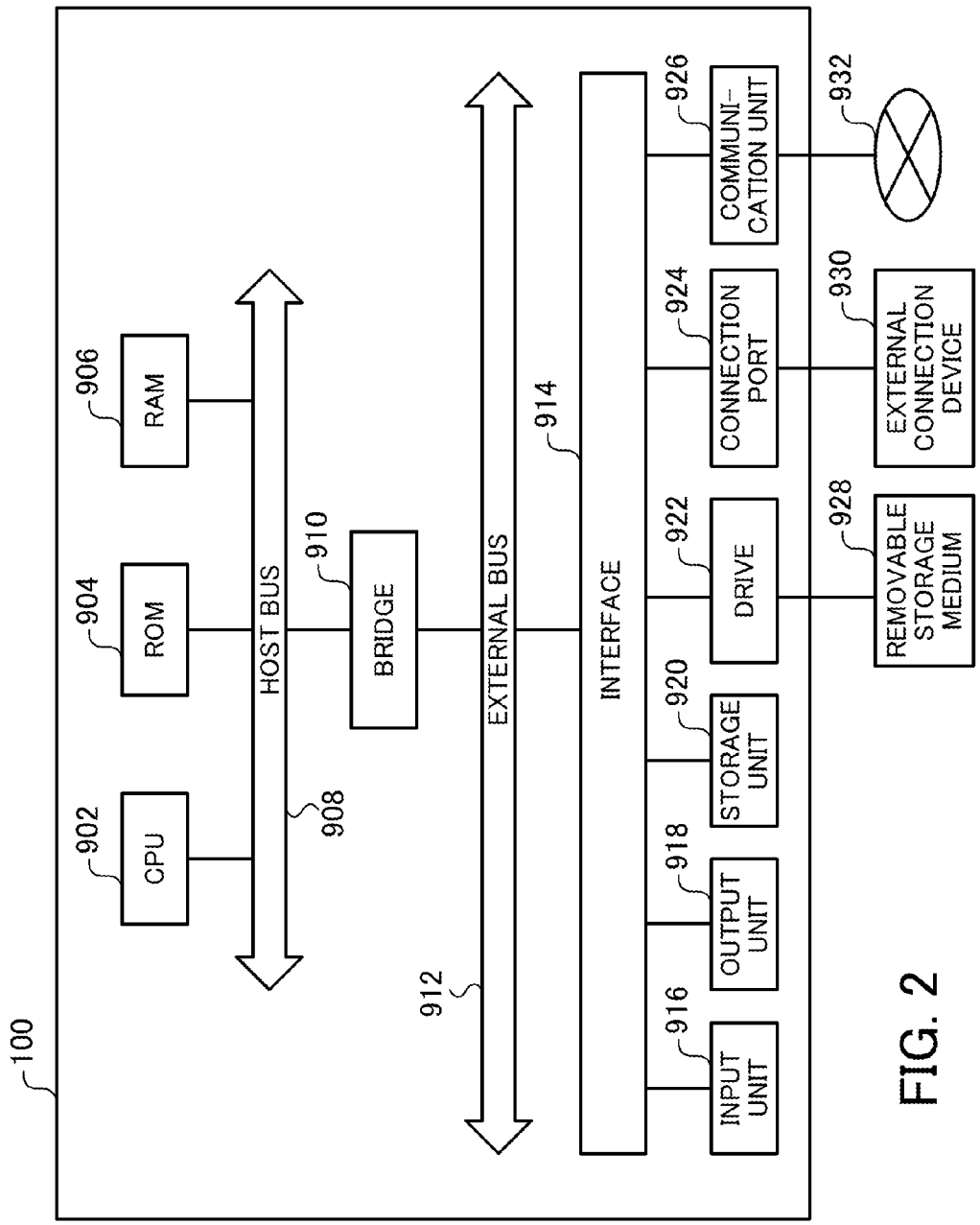
FIG. 2 illustrates an example of hardware capable of realizing functions of an image processing apparatus according to a second embodiment.

Here, with reference to FIG. 2, hardware capable of realizing the functions of the image processing apparatus 100 will be explained. FIG. 2 illustrates an example of the hardware capable of realizing the functions of the image processing apparatus according to the second embodiment.

The functions included in the image processing apparatus 100 are realized by the use of a hardware resource of an information processing apparatus illustrated in FIG. 2, for example. That is, the functions included in the image processing apparatus 100 are realized by means of controlling the hardware illustrated in FIG. 2 using a computer program.

As illustrated in FIG. 2, this hardware includes a CPU 902, a ROM (Read Only Memory) 904, a RAM 906, a host bus 908, and a bridge 910, as main components. Moreover, this hardware includes an external bus 912, an interface 914, an input unit 916, an output unit 918, a storage unit 920, a drive 922, a connection port 924, and a communication unit 926.

The CPU 902 functions as an arithmetic processing apparatus or a control apparatus, for example, and controls the whole or a part of operation in each component according to various kinds of program stored in the ROM 904, the RAM 906, the storage unit 920, or a removable storage medium 928. The ROM 904 is an example of a storage apparatus storing a program to be read into the CPU 902, data to be used for calculation, and the like. The RAM 906 stores a program to be read into the CPU 902, various kinds of parameter which are changed when the program is executed, and the like, for example, temporarily or permanently.

While these constituents are connected to one another via the host bus 908 capable of high-speed data transmission, the host bus 908 is connected to the external bus 912 having a comparatively low data transmission speed via the bridge 910, for example. Further, for the input unit 916, a mouse, a keyboard, a touch panel, a touch pad, a button, a switch, a lever, or the like is used, for example. Further, a remote controller capable of transmitting a control signal using infrared light or other radio waves is sometimes used for the input unit 916.

For the output unit 918, a display apparatus such as a CRT (Cathode Ray Tube), an LCD (Liquid Crystal Display), a PDP (Plasma Display Panel), or an ELD (Electro-luminescence Display) is used, for example. Further, an audio output apparatus such as a speaker or a headphone, a printer, or the like is sometimes used for the output unit 918. That is, the output unit 918 is capable of outputting information visually or aurally.

The storage unit 920 stores various kinds of data. A magnetic storage device such as an HDD is used for the storage unit 920, for example. Further, a semiconductor storage device such as an SSD (Solid State Drive) or a RAM disk, an optical storage device, a magneto-optical storage device, or the like may be used for the storage unit 920.

The drive 922 reads out information stored in the removable storage medium 928 which is a removable storage medium and writes information into the removable storage medium 928. For example, a magnetic disk, an optical disk, a magneto-optical disk, a semiconductor memory, or the like is used for the removable storage medium 928.

The connection port 924 is a port for connecting an external connection device 930, such as a USB (Universal Serial Bus) port, an IEEE 1394 port, an SCSI (Small Computer System Interface), an RS-232C port, or an optical audio terminal, for example. A camera, a printer, or the like is used for the external connection device 930, for example.

The communication unit 926 is a communication device for connection to a network 932. A communication circuit for a wired or wireless LAN (Local Area Network), a communication circuit for a WUSB (Wireless USB), a communication circuit or a router for optical communication, a communication circuit or a router for an ADSL (Asymmetric Digital Subscriber Line), a communication circuit for a mobile phone network, or the like is used for the communication unit 926, for example. The network 932 connected with the communication unit 926 is a network connected by wire or radio, and includes the internet, a LAN, a broadcasting network, a satellite communication line, and the like, for example.

In the above, the hardware has been explained.

(2-2. Functions of Image Processing Apparatus)

Figure 3:
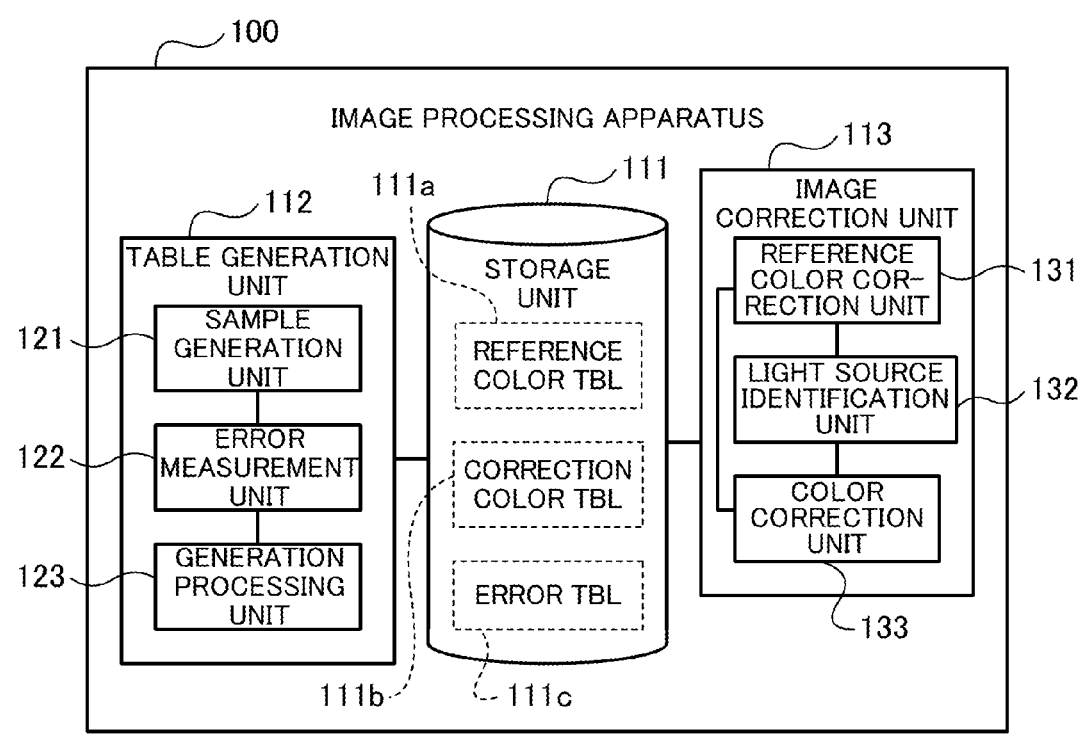
FIG. 3 is a block diagram illustrating an example of functions included in the image processing apparatus according to the second embodiment.

Next, with reference to FIG. 3, the functions of the image processing apparatus 100 will be explained. FIG. 3 is a block diagram illustrating an example of the functions included in the image processing apparatus according to the second embodiment. Here, FIG. 4 to FIG. 10 will be referred to as needed in the explanation.

As illustrated in FIG. 3, the image processing apparatus 100 includes a storage unit 111, a table generation unit 112, and an image correction unit 113.

Here, the function of the storage unit 111 is realized by the use of the above RAM 906, storage unit 920 and the like. Further, the functions of the table generation unit 112 and the image correction unit 113 are realized by the use of the above CPU 902 and the like. Further, the image processing apparatus 100 may be connected with an apparatus to detect the positions of reference colors from an input image including a color chart where the reference colors are arranged and to extract the information of the reference colors from the input image, as the external connection device 930. Note that, when the position of the color chart disposed in the input image is preliminarily determined, such an apparatus may be omitted.

(Storage Unit 111)

The storage unit 111 will be explained.

The storage unit 111 stores a reference color table 111a, a correction color table 111b, and an error table 111c. Here, the "table" is denoted by "TBL" in FIG. 3.

The reference color table 111a associates a number to identify a reference color with coordinates (color coordinates) corresponding to the reference color in a color space. The correction color table 111b associates a number to identify a reference color for light source identification with the color coordinates of a correction color calculated for each light source. Here, the correction color is obtained by correcting a detection color obtained by observing the reference color for light source identification under a specific light source, by the linear interpolation based on the reference color for color correction. The error table 111c associates respective color coordinates with a correction error caused by the light source difference and this light source.

In the following, the reference color table 111a, the correction color table 111b and the error table 111c will be further explained.

(Reference Color Table)

With reference to FIGS. 4 and 5, the reference color table 111a will be explained. FIG. 4 illustrates an example of the reference color table according to the second embodiment. FIG. 5 explains the reference color.

The reference color table 111a illustrated in FIG. 4 describes a number (No.) to identify a preliminarily set reference color and the color coordinates of the reference color in association with each other. For example, the color coordinates (R, G, B) of a reference color #1 are (120, 100, 200). Further, the color coordinates (R, G, B) of a reference color #2 are (200, 50, 150). Here, R expresses a red component, G expresses a green component, and B expresses a blue component.

The reference colors described in the reference color table 111a include the reference color for light source identification and the reference colors for color correction. Therefore, when the number of the reference colors for color correction used for color correction of one color is h, (h+1) or more reference colors are described in the reference color table 111a.

Further, when two or more reference colors for light source identification are provided, (h+2) or more reference colors are described in the reference color table 111a. Meanwhile, when an input image is captured, a color sample including the reference colors is imaged together with an object. At this time, the color sample including the reference color for light source identification together with the reference colors for color correction is used (e.g., color chart or circular patch illustrated in FIG. 5, or the like).

(Correction Color Table)

Figure 7:
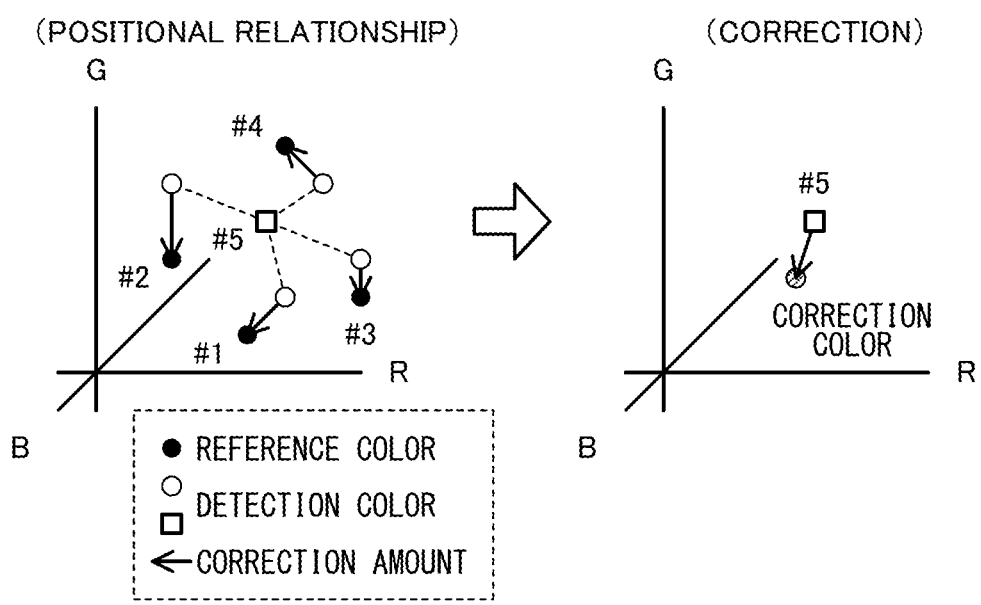
FIG. 7 explains a correction amount calculation method by a linear interpolation.

Next, with reference to FIGS. 6 and 7, the correction color table 111b will be explained. FIG. 6 illustrates an example of the correction color table according to the second embodiment. FIG. 7 explains a correction amount calculation method by linear interpolation.

As illustrated in FIG. 6, the correction color table 111b describes a number to identify a reference color for light source identification and the color coordinates of a correction color obtained by correcting a detection color of the reference color for light source identification detected from an image captured under a specific light source by the interpolation processing using the reference colors for color correction, for each light source. In the example of FIG. 6, for the reference color #5, color coordinates (122, 100, 200)

of the correction color for a light source #1 and color coordinates (120, 104, 199) of the correction color for a light source #2 are illustrated.

The correction color obtained by correcting the reference color for light source identification is calculated from the detection colors detected for the reference colors for color correction by linear interpolation, as illustrated in FIG. 7. FIG. 7 illustrates four reference colors (black circles) #1, #2, #3 and #4 for color correction, detection colors (white circles) of the reference colors #1, #2, #3 and #4, and a detection color (rectangle) of a reference color #5 for light source identification.

The color coordinates of reference colors #1, #2, #3 and #4 are already known. Therefore, the difference vectors between the four detection colors for the reference colors #1, #2, #3 and #4 and the reference colors #1, #2, #3 and #4 become correction amounts for the reference colors #1, #2, #3 and #4, respectively. Further, the correction color of the reference color #5 is calculated by linear interpolation from positional relationships between the detection colors of the reference colors #1, #2, #3 and #4 and the detection color of the reference color #5 in the color space.

For example, the color coordinates of the detection colors for the reference colors #1, #2, #3 and #4 are denoted by $(r_{o1}, g_{o1}, b_{o1})$, $(r_{o2}, g_{o2}, b_{o2})$, $(r_{o3}, g_{o3}, b_{o3})$, and $(r_{o4}, g_{o4}, b_{o4})$, respectively. Further, the color coordinates of the detection color for the reference color #5 are denoted by $(r_{o5}, g_{o5}, b_{o5})$. Any color coordinate is able to be expressed by a linear sum of vectors between the reference colors. Accordingly, the color coordinates of the detection color for the reference color #5 is expressed as in the following formula (1) by the use of the color coordinates of the detection colors for the reference colors #1, #2, #3 and #4. Here, $h_1$, $h_2$ and $h_3$ are parameters.

$$\begin{bmatrix} r_{o5} \\ g_{o5} \\ b_{o5} \end{bmatrix} = \begin{bmatrix} r_{o2}-r_{o1} & r_{o3}-r_{o1} & r_{o4}-r_{o1} \\ g_{o2}-g_{o1} & g_{o3}-g_{o1} & g_{o4}-g_{o1} \\ b_{o2}-b_{o1} & b_{o3}-b_{o1} & b_{o4}-b_{o1} \end{bmatrix} \begin{bmatrix} h_1 \\ h_2 \\ h_3 \end{bmatrix} + \begin{bmatrix} r_{o1} \\ g_{o1} \\ b_{o1} \end{bmatrix} \quad (1)$$

Further, the parameters $h_1$, $h_2$ and $h_3$ are calculated by the use of the following formula (2) which is deformed from the above formula (1). Here, the color coordinates of the reference colors #1, #2, #3 and #4 are denoted by $(r_1, g_2, b_1)$, $(r_2, g_2, b_2)$, $(r_3, g_3, b_3)$, and $(r_4, g_4, b_4)$, respectively. Here, the color coordinates $(r_{m5}, g_{m5}, b_{m5})$ of the correction color obtained by correcting the detection color of the reference color #5 according to correction amounts for the reference colors #1, #2, #3 and #4 are calculated by the following formula (3) by the use of the parameters $h_1$, $h_2$ and $h_3$ which are calculated by the use of the following formula (2).

$$\begin{bmatrix} h_1 \\ h_2 \\ h_3 \end{bmatrix} = \begin{bmatrix} r_{o2}-r_{o1} & r_{o3}-r_{o1} & r_{o4}-r_{o1} \\ g_{o2}-g_{o1} & g_{o3}-g_{o1} & g_{o4}-g_{o1} \\ b_{o2}-b_{o1} & b_{o3}-b_{o1} & b_{o4}-b_{o1} \end{bmatrix}^{-1} \begin{bmatrix} r_{o5}-r_{o1} \\ g_{o5}-g_{o1} \\ b_{o5}-b_{o1} \end{bmatrix} \quad (2)$$

$$\begin{bmatrix} r_{m5} \\ g_{m5} \\ b_{m5} \end{bmatrix} = \begin{bmatrix} r_2-r_1 & r_3-r_1 & r_4-r_1 \\ g_2-g_1 & g_3-g_1 & g_4-g_1 \\ b_2-b_1 & b_3-b_1 & b_4-b_1 \end{bmatrix} \begin{bmatrix} h_1 \\ h_2 \\ h_3 \end{bmatrix} + \begin{bmatrix} r_1 \\ g_1 \\ b_1 \end{bmatrix} \quad (3)$$

For all the reference colors for light source identification, the correction colors are obtained by calculation based on the above formula (3), and described in the correction color table 111b. Similarly, the detection colors of the reference colors #1, , and #5 are detected from the input image captured under a different light source, and the correction colors are obtained by the above method according to the detection colors and described in the correction color table 111b. By such a method, the correction color table 111b is obtained.

(Error Table)

Figure 8:
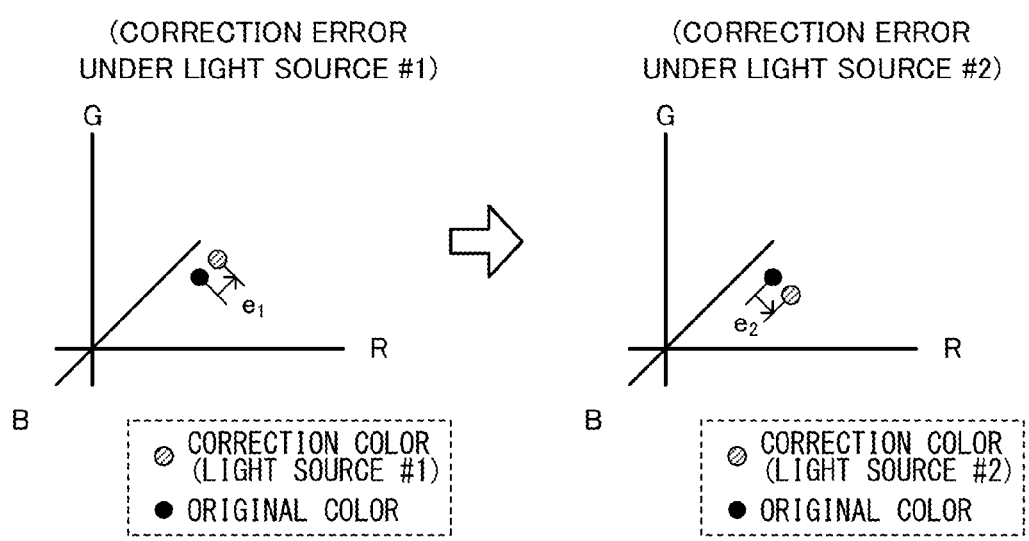
FIG. 8 explains a correction error.

Next, with reference to FIGS. 8 and 9, the error table 111c will be explained. FIG. 8 explains the correction error. FIG. 9 illustrates an example of the error table according to the second embodiment.

Each color of the input image is corrected by linear interpolation based on the reference colors for color correction as in the above correction color calculation method for the reference color #5 for light source identification. That is, the color coordinates of a correction color is calculated by linear interpolation from positional relationships between the four detection colors and an input color in the color space and the color coordinates of the reference colors #1, #2, #3 and #4. Accordingly, sometimes a non-linear error component which is unable to be corrected completely by linear interpolation remains in the correction color.

A color is given by a product of a spectrum characteristic of a light source, a reflection characteristic of an object, and a sensitivity characteristic of a camera at each frequency. Among these characteristics, a factor providing the above non-linear error component is the spectrum characteristic of a light source. The spectrum characteristic of a light source is considerably different between a light source for reference (in the following, reference light source; e.g., daylight) and a fluorescent light, a light bulb, or the like. Accordingly, sometimes a correction error is caused between the correction color and an original color of an input color, when the detection colors corresponding to the reference colors for color correction are detected from an image captured under a light source different from the reference light source, and any input color is corrected by the detection colors.

Further, as illustrated in FIG. 8, when the light source is changed from the light source #1 to the light source #2, it changes how the correction error is caused (in the example of FIG. 8, changes from $e_1$ to $e_2$). Accordingly, the error table 111c is prepared describing the correction error caused by the light source difference, and the correction error is made to be eliminated from the correction color calculated for any color.

As illustrated in FIG. 9, the error table 111c describes a correction error prepared for each color coordinate in the color space for each light source. However, in FIG. 9, dR expresses a correction error caused in the R-coordinate of a correction color, dG expresses a correction error caused in the G-coordinate of the correction color, and dB expresses a correction error caused in the B-coordinate of the correction color.

For example, in the input image captured under the light source #1, a correction color having the color coordinates (0,0,1) is adjusted to cause the R-coordinate, the G-coordinate, and the B-coordinate to be shifted by +1, +2, and +2, respectively, so as to compensate a correction error. That is, the correction error values described in the error table 111c are utilized as adjustment values for adjusting the color coordinates of the correction color.

In the above, the storage unit 111 has been explained.

(Table Generation Unit 112)

Next, the table generation unit 112 will be explained.

FIG. 3 is referred to again. The table generation unit 112 generates the above reference color table 111a, correction color table 111b, and error table 111c. Here, the table generation unit 112 includes a sample generation unit 121, an error measurement unit 122, and a generation processing unit 123.

When generating the reference color table 111a, the table generation unit 112 detects the color coordinates of the reference colors from a captured image obtained by imaging a sample including the reference colors under a reference light source, and describes the detected color coordinates and identification numbers of the reference colors in the reference color table 111a in association with each other.

When generating the correction color table 111b, the table generation unit 112 detects the color coordinates of a detection color corresponding to each of the reference colors from an image obtained by imaging a sample including the reference color for light source identification and the reference colors for color correction under a light source different from the reference light source.

Then, the table generation unit 112 calculates the correction color of the reference color for light source identification from the reference colors for color correction according to the above formulas (1) to (3), and describes the color coordinates of the calculated correction color in the correction color table 111b in association with the identification number of the reference color for light source identification.

The sample generation unit 121 generates a color sample artificially (pseudo sample in the following) when generating the error table 111c. The error measurement unit 122 measures correction errors obtained when the color of the pseudo sample is corrected by the use of the reference colors for color correction. The generation processing unit 123 describes the correction errors in the error table 111c in association with the color coordinates of the pseudo sample.

Here, a generation method of the pseudo sample and a measurement method of the correction error will be further explained.

A workload is large when all the colors in the color space are prepared and the correction errors are calculated from captured images obtained by imaging a sample for each of the colors under various light sources. Accordingly, the correction error calculation is performed by the use of the pseudo sample generated by the sample generation unit 121.

A color is given by the product of the spectrum characteristic of a light source, the reflection characteristic of an object, and the sensitivity characteristic of a camera at each frequency. For example, a method of determining the reflection characteristic of an object is described in literature A: Nakao et al. "Real time spectral image processing for skin components analysis", Medical Imaging Technology, vol. 20, No. 2, pp. 123-133, March 2002. Further, for example, a method of measuring the sensitivity characteristic of a camera is described in literature B: Kuno et al. "A Measurement Method for Spectral Responsivity of Digital Cameras", ITE Technical Report, vol. 22, no. 73, pp. 13-18, 1998.

The sample generation unit 121 generates a pseudo sample which has a specific color under the reference light source. The pseudo sample is obtained by decomposing the spectral reflection characteristics of a plurality of existing samples into vectors corresponding to main components, and combining the decomposed vectors linearly.

Here, the spectrum distribution $P(\lambda)$ ($\lambda$: light wavelength) of a light source is assumed to have been measured preliminarily. As the existing samples, n samples are assumed to have been prepared. Further, the reflection spectral characteristics $R_n(\lambda)$ of the n samples are assumed to have been measured preliminarily. Note that the following explanation will be made by the use of $\{P_{\lambda i}\}$ and $\{R_{n,\lambda i}\}$ which express $P(\lambda)$ and $R_n(\lambda)$, respectively, discretely in terms of a wavelength $\lambda$. Here, i=1, ..., n. For example, when a spectrum of 400 nm to 700 nm is sampled at an interval of 10 nm, 31 sampling data sets $\{R_{n,\lambda 1}, \ldots R_{n,\lambda 31}\}$ are obtained as observation data of the reflection spectral characteristic.

An average vector, an eigenvalue (or singular value), and an eigenvector (or singular vector) which are obtained from the reflection spectral characteristic of the sample observation are assumed to be defined as $\mu$, $\eta_k$ and $\phi_k$, respectively. Here, k=1, 2, 3. When the number of the samples is n, and the reflection spectral characteristics of the respective samples are expressed by vectors $R_m=[R_{m,\lambda 1}, \ldots, R_{m,\lambda n}]$ (here, m=1, ..., n), the average vector $\mu$ is given by the following formula (4). Here, the superscript of T expresses transposition.

$$\mu = \frac{1}{n}\sum_m R_m \quad (4)$$

In this case, the sample generation unit 121 generates an n-by-n matrix in which n vectors Rm are arranged in a row and obtains the eigenvalue $\eta_k$ and the eigenvector $\phi k$ from the matrix. Note that, when the number of the samples is small and the matrix does not become a square matrix, the sample generation unit 121 performs singular value decomposition on the matrix, and sets a singular value and a left singular vector to be $\eta_k$ and $\phi_k$, respectively.

Further, the sample generation unit 121 generates a matrix S arranging the reflection spectral characteristic $\{R_{n,\lambda 1}, \ldots, R_{n,\lambda n}\}$ of a specific light source as diagonal elements and setting other elements to 0. Here, the sensitivity characteristic $\{r_s, g_s, b_s\}$ of a camera is assumed to have been observed. Here, $r_s=[r_{\lambda 1}, r_{\lambda 2}, \ldots, r_{\lambda n}]^T$, $g_s=[g_{\lambda 1}, g_{\lambda 2}, \ldots, g_{\lambda n}]^T$, and $b_s=[b_{\lambda 1}, b_{\lambda 2}, \ldots b_{\lambda n}]^T$. Note that the sensitivity characteristic $\{r_s, g_s, b_s\}$ is obtained by the method described in above literature B.

By the use of the above eigenvalue (or singular value) $\eta_k$, the eigenvector (or singular vector) $\phi_k$, the matrix 5, the average vector $\mu$, and the camera sensitivity characteristic $\{r_s, g_s, b_s\}$, a color $[r, g, b]^T$ is given by the following formula (5) by the use of parameters $\{\alpha_1, \alpha_2, \alpha_3\}$. Here, when a vector $\mu_0$ is defined by the following formula (6), the following formula (5) is deformed as in the following formula (7).

$$\begin{bmatrix} r \\ g \\ b \end{bmatrix} = \begin{bmatrix} r_s^T \\ g_s^T \\ b_s^T \end{bmatrix} S \left( [\phi_1 \ \phi_2 \ \phi_3] \begin{bmatrix} \alpha_1 \\ \alpha_2 \\ \alpha_3 \end{bmatrix} + \mu \right) \quad (5)$$

$$\mu_0 = \begin{bmatrix} r_s^T \\ g_s^T \\ b_s^T \end{bmatrix} S \mu \quad (6)$$

$$\begin{bmatrix} r \\ g \\ b \end{bmatrix} = \begin{bmatrix} r_s^T \\ g_s^T \\ b_s^T \end{bmatrix} S [\phi_1 \ \phi_2 \ \phi_3] \begin{bmatrix} \alpha_1 \\ \alpha_2 \\ \alpha_3 \end{bmatrix} + \mu_0 \quad (7)$$

The sample generation unit 121 generates a pseudo sample of a color $[r_x, g_x, b_x]^T$ under the reference light source using the above formula (7). The above formula (7) is deformed as in the following formula (8). Then, the sample generation unit 121 calculates the parameters $\{\alpha_1, \alpha_2, \alpha_3\}$ using following formula (8). Here, the reflection characteristic of an object is expressed by the calculated parameters $\{\alpha_1, \alpha_2, \alpha_3\}$ as in the following formula (9).

$$\begin{bmatrix} \alpha_1 \\ \alpha_2 \\ \alpha_3 \end{bmatrix} = \left( \begin{bmatrix} r_s^T \\ g_s^T \\ b_s^T \end{bmatrix} S [\phi_1 \quad \phi_2 \quad \phi_3] \right)^{-1} \left( \begin{bmatrix} r_x \\ g_x \\ b_x \end{bmatrix} - \mu_0 \right) \quad (8)$$

$$\left( [\phi_1 \quad \phi_2 \quad \phi_3] \begin{bmatrix} \alpha_1 \\ \alpha_2 \\ \alpha_3 \end{bmatrix} + \mu \right) \quad (9)$$

By changing the above color $[r_x, g_x, b_x]^T$, it is possible to change a desired color in the pseudo sample. Accordingly, the sample generation unit 121 calculates the parameters $\{\alpha_1, \alpha_2, \alpha_3\}$ for various colors by the above formula (8). Further, it is possible to change the light source by changing the above matrix S. Accordingly, the sample generation unit 121 obtains the colors of the pseudo sample under various light sources by the above formula (5) while changing $[r_x, g_x, b_x]^T$.

The error measurement unit 122 calculates an error observed when the reference light source is changed to another light source. How the sample color under the reference light source changes under another light source is obtained by changing the matrix S to a matrix S for the another light source in the above formula (5) and calculating a color $[r, g, b]^T$ observed under the another light source. For example, the error measurement unit 122 calculates a correction error {dR, dG, dB} given by the following formula (10) while changing the matrix S and $[r_x, g_x, b_x]^T$, and stores the calculated result into the error table 111c.

For example, when the color coordinates of a sample which has color coordinates (100, 100, 100) under the reference light source are calculated to be (103, 103, 103) under another light source, the error measurement unit 122 calculates (3, 3, 3) from the following formula (10) and stores the calculated result into the error table 111c. The error table 111c is obtained by carrying out the pseudo sample generation by the sample generation unit 121 and the correction error calculation by the error measurement unit 122 for all the combinations of the colors.

$$\begin{bmatrix} dR \\ dG \\ dB \end{bmatrix} = \begin{bmatrix} r \\ g \\ b \end{bmatrix} - \begin{bmatrix} r_x \\ g_x \\ b_x \end{bmatrix} \quad (10)$$

In the above, the table generation unit 112 has been explained.

(Image Correction Unit 113)

Figure 10:
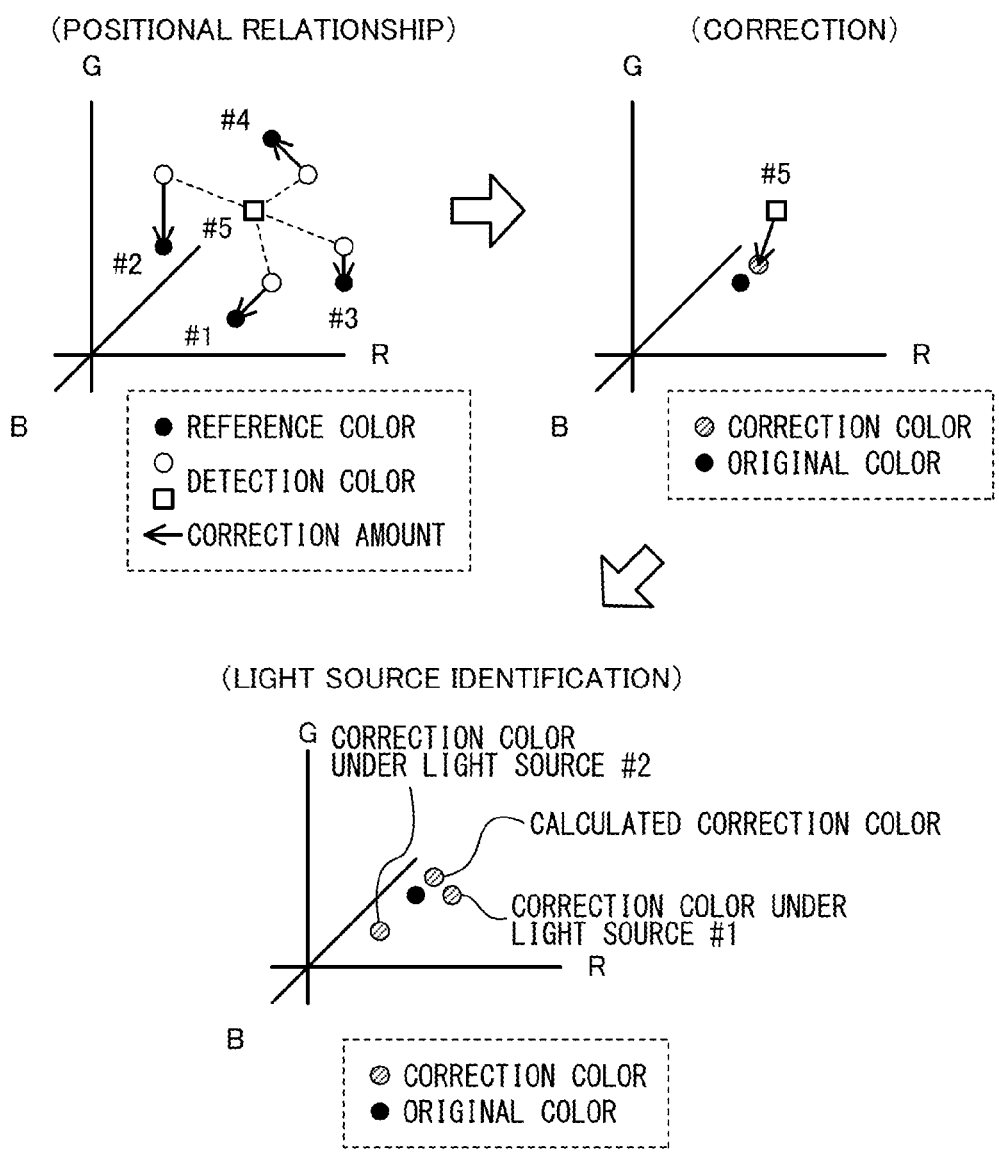
FIG. 10 explains a light source identification method according to the second embodiment.

Next, the image correction unit 113 will be explained. Here, FIG. 10 will be referred to in the explanation. FIG. 10 explains a light source identification method according to the second embodiment.

As illustrated in FIG. 3, the image correction unit 113 includes a reference color correction unit 131, a light source identification unit 132, and a color correction unit 133.

The reference color correction unit 131 detects the detection colors of the reference colors for color correction and the detection color of the reference colors for light source identification from the input image, and calculates the correction color of the reference color for light source identification according to the above formulas (1) to (3). The correction color information calculated by the reference color correction unit 131 is input into the light source identification unit 132. The light source identification unit 132 detects a correction color having the color coordinates closest to those of the correction color calculated by the reference color correction unit 131, with reference to the correction color table 111b.

For example, when the reference color correction unit 131 calculates the correction color for the reference color #5 (refer to FIG. 10), the light source identification unit 132 detects a correction color closest to the correction color calculated by the reference color correction unit 131 among the correction colors corresponding to the reference color #5 described in the correction color table 111b.

For example, when the calculated correction color is $(r_{m0}, g_{m0}, b_{m0})$, the correction color of the light source #1 is $(r_{mA}, g_{mA}, b_{mA})$, and the correction color of the light source #2 is $(r_{mB}, g_{mB}, b_{mB})$, the closest correction color is obtained by the following formula (11).

Here, $|\ldots|$ expresses a norm. Note that, in the example of FIG. 10, the correction color corresponding to the light source #1 is detected as the correction color closest to the correction color calculated by the reference color correction unit 131.

$$\min(|r_{m0}-r_{mA}, g_{m0}-g_{mA}, b_{m0}-b_{mA}|, |r_{m0}-r_{mB}, g_{m0}-g_{mB}, b_{m0}-b_{mB}|, |r_{m0}-r_{mC}, g_{m0}-g_{mC}, b_{m0}-b_{mC}|) \quad (11)$$

The light source identification unit 132 identifies a light source corresponding to the correction color detected from the correction color table 111b as the light source used in the input image capturing. In the example of FIG. 10, the light source #1 is identified as the light source used in the input image capturing. The information of the light source identified by the light source identification unit 132 is input into the color correction unit 133.

The color correction unit 133 detects the detection color of each color (input color) included in the input image, and calculates the correction color of the input color according to the above formulas (1) to (3) as in the method of calculating the correction color for the reference color for light source identification. For example, in the above formulas (1) and (2), the color coordinates $(r_{o5}, g_{o5}, b_{o5})$ of the detection color for the reference color #5 may be replaced by the color coordinates $(r_o, g_o, b_o)$ of the detection color for the input color. Further, in the above formula (3), the color coordinates $(r_{m5}, g_{m5}, b_{m5})$ of the correction color for the reference color #5 may be replaced by the color coordinates $(r_m, g_m, b_m)$ of the correction color for the input color.

The color correction unit 133 refers to the error table 111c, and detects a correction error corresponding to the light source and the color coordinates of the correction color which are indicated by the information input from the light source identification unit 132. Then, the color correction unit 133 adjusts the color coordinates of the correction color so as to compensate the detected correction error.

In the above, the image correction unit 113 has been explained.

As above, by means of identifying a light source according to how the correction error is caused and adjusting the color coordinates of a correction color so as to compensate the correction error based on the identified light source, the correction error depending on the light source is suppressed and the color correction accuracy is improved.

In the above, the functions of the image processing apparatus 100 have been explained.

(2-3. Variation Example #1 (light source Identification by vote (count))

Figure 11:
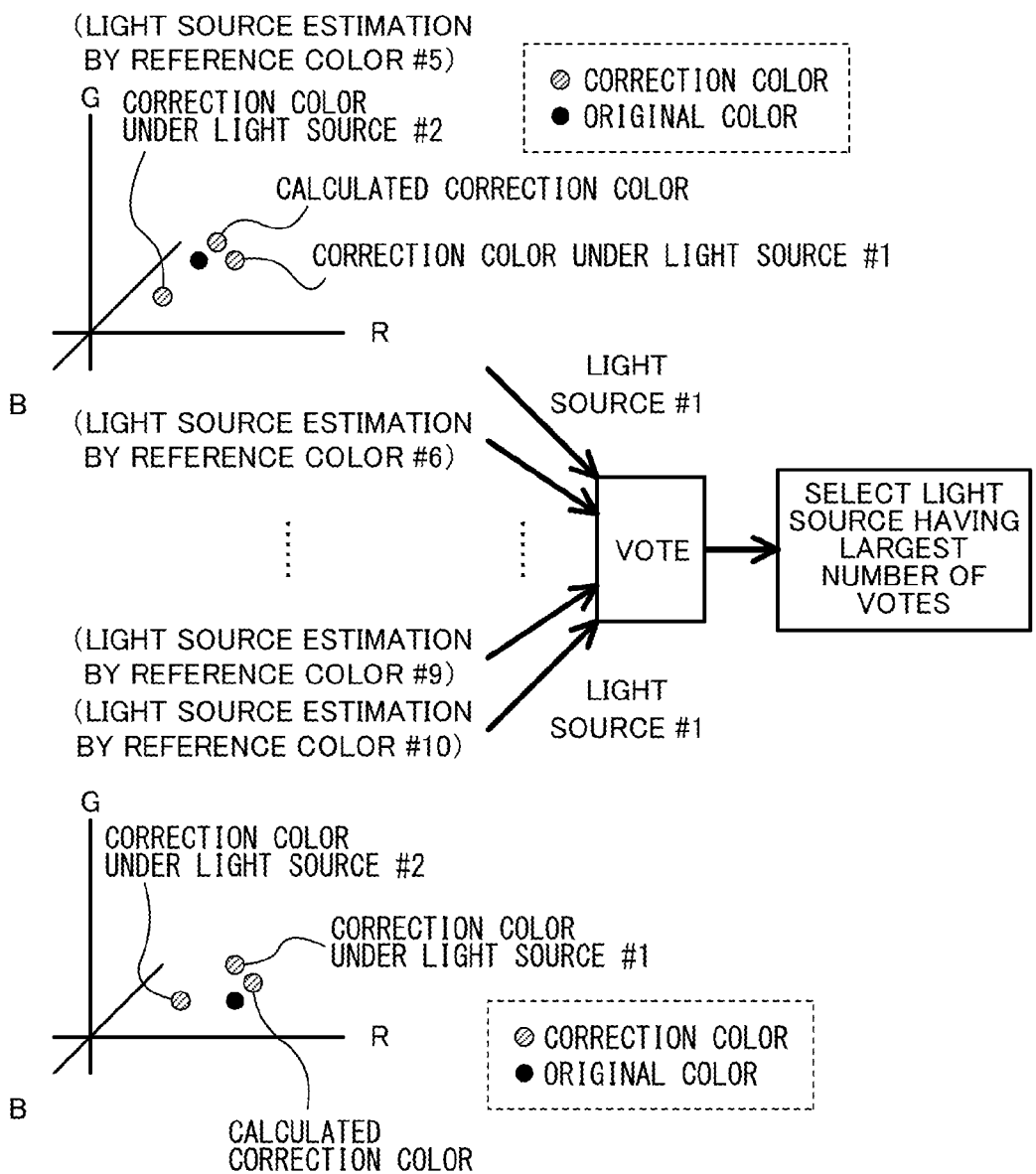
FIG. 11 explains a light source identification method according to a variation example (variation example #1) of the second embodiment.

Here, with reference to FIG. 11, a light source identification method according to a variation example (variation example #1) of the second embodiment will be explained. FIG. 11 explains the light source identification method according to the variation example (variation example #1) of the second embodiment.

The light source identification method according to the variation example #1 utilizes a plurality of reference colors for light source identification. As illustrated in FIG. 11, a case in which reference colors #5, #6, . . . , and #10 are used as the reference colors for light source identification will be considered as an example. In the variation example #1, the reference color correction unit 131 and the light source identification unit 132 calculate the correction color for each of the reference colors #5, #6, . . . , and #10 by interpolation processing based on the reference colors for color correction, and detect a correction color closest to the calculated correction color from the correction color table 111b. Then, the light source identification unit 132 votes for a light source corresponding to the detected correction color.

For example, when a correction color closest to the correction color of the reference color #5 in the correction color table 111b corresponds to the light source #1, the light source identification unit 132 increases the number of votes for the light source #1. The light source identification unit 132 carries out the vote also for the reference colors #6, #7, . . . , and #10, and counts the number of votes for each light source. Then, the light source identification unit 132 selects a light source having the largest number of votes, and identifies the selected light source as a light source used in the input image capturing. In this manner, by utilizing the plurality of reference colors, it is possible to improve the possibility of identifying a right light source.

In the above, the light source identification method according to the variation example #1 has been explained.

(2-4. Variation Example #2 (mixing ratio calculation))

Figure 12:
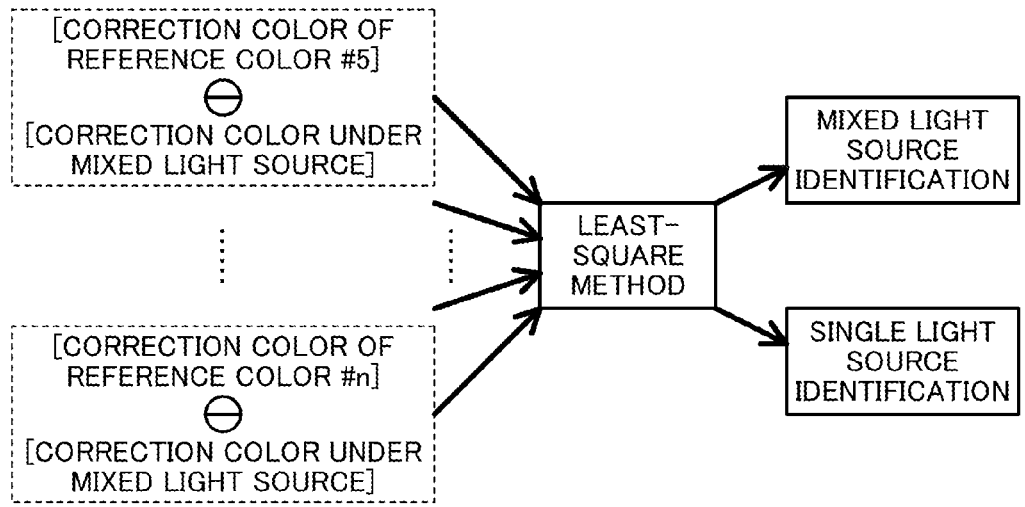
FIG. 12 is explains a light source identification method according to a variation example (variation example #2) of the second embodiment.

Next, with reference to FIG. 12, a light source identification method according to a variation example (variation example #2) of the second embodiment will be explained. FIG. 12 explains the light source identification method according to the variation example (variation example #2) of the second embodiment.

In the light source identification method according to the variation example #2, a mixed light source mixing a plurality of light sources is supposed, and a mixing ratio of the mixed light source close to a light source used in input image capturing is calculated and a light source is identified according to the calculated mixing ratio.

Here, the light source used in the input image capturing is assumed to be expressed by a mixture of light sources #1, #2 and #3, and the mixing ratio thereof is expressed by weights $w_A$, $w_B$ and $w_C$. Further, the correction colors of the light source #1, light source #2, and light source #3 corresponding to a reference color for light source identification are denoted by $(r_{mA}, g_{mA}, b_{mA})$, $(r_{mB}, g_{mB}, b_{mB})$, and $(r_{mC}, g_{mC}, b_{mC})$, respectively. In this case, the correction color $(r_m, g_m, b_m)$ of the reference color for light source identification is given by the following formula (12). Accordingly, when the number of reference colors for light source identification is one, the weights $w_A$, $w_B$ and $w_C$ are obtained according to the following formula (13) obtained by deforming the following formula (12).

$$\begin{bmatrix} r_m \\ g_m \\ b_m \end{bmatrix} = \begin{bmatrix} r_{mA} & r_{mB} & r_{mC} \\ g_{mA} & g_{mB} & g_{mC} \\ b_{mA} & b_{mB} & b_{mC} \end{bmatrix} \begin{bmatrix} w_A \\ w_B \\ w_C \end{bmatrix} \quad (12)$$

$$\begin{bmatrix} w_A \\ w_B \\ w_C \end{bmatrix} = \begin{bmatrix} r_{mA} & r_{mB} & r_{mC} \\ g_{mA} & g_{mB} & g_{mC} \\ b_{mA} & b_{mB} & b_{mC} \end{bmatrix}^{-1} \begin{bmatrix} r_m \\ g_m \\ b_m \end{bmatrix} \quad (13)$$

When a plurality of reference colors for light source identification is used, as illustrated in FIG. 12, the weights $w_A$, $w_B$ and $w_C$ are obtained by the use of a least-square method. Here, a correction color of a reference color #k (k=5, 6, . . . ) calculated by the reference color correction unit 131 is denoted by $(r_{mk}, g_{mk}, \ldots b_{mk})$. Further, correction colors of the light source #1, light source #2 and light source #3 corresponding to the reference color #k are denoted by $(r_{mAk}, g_{mAk}, b_{mAk})$, $(r_{mBk}, g_{mBk}, b_{mBk})$, and $(r_{mCk}, g_{mCk}, b_{mCk})$, respectively. The light source identification unit 132 calculates the weight $w_A$, $w_B$ and $w_C$ where an evaluation formula J expressed by the following formula (14) becomes smallest (refer to the following formula (15)).

$$J = \sum_{k=1}^{n} \left( \begin{bmatrix} r_{mk} \\ g_{mk} \\ b_{mk} \end{bmatrix} - \begin{bmatrix} r_{mAk} & r_{mBk} & r_{mCk} \\ g_{mAk} & g_{mBk} & g_{mCk} \\ b_{mAk} & b_{mBk} & b_{mCk} \end{bmatrix} \begin{bmatrix} w_A \\ w_B \\ w_C \end{bmatrix} \right)^T \quad (14)$$

$$\left( \begin{bmatrix} r_{mk} \\ g_{mk} \\ b_{mk} \end{bmatrix} - \begin{bmatrix} r_{mAk} & r_{mBk} & r_{mCk} \\ g_{mAk} & g_{mBk} & g_{mCk} \\ b_{mAk} & b_{mBk} & b_{mCk} \end{bmatrix} \begin{bmatrix} w_A \\ w_B \\ w_C \end{bmatrix} \right)$$

$$\begin{bmatrix} w_A \\ w_B \\ w_C \end{bmatrix} = \begin{bmatrix} X_{11} & X_{12} & X_{13} \\ X_{21} & X_{22} & X_{23} \\ X_{31} & X_{32} & X_{33} \end{bmatrix}^{-1} \begin{bmatrix} Y_1 \\ Y_2 \\ Y_3 \end{bmatrix} \quad (15)$$

where $X_{11} = \sum_k (r_{mAk} \cdot r_{mAk} + g_{mAk} \cdot g_{mAk} + b_{mAk} \cdot b_{mAk})$, $X_{12} = \sum_k (r_{mAk} \cdot r_{mBk} + g_{mAk} \cdot g_{mBk} + b_{mAk} \cdot b_{mBk})$, $X_{13} = \sum_k (r_{mAk} \cdot r_{mCk} + g_{mAk} \cdot g_{mCk} + b_{mAk} \cdot b_{mCk})$, $X_{21} = \sum_k (r_{mBk} \cdot r_{mAk} + g_{mBk} \cdot g_{mAk} + b_{mBk} \cdot b_{mAk})$, $X_{22} = \sum_k (r_{mBk} \cdot r_{mBk} + g_{mBk} \cdot g_{mBk} + b_{mBk} \cdot b_{mBk})$, $X_{23} = \sum_k (r_{mBk} \cdot r_{mCk} + g_{mBk} \cdot g_{mCk} + b_{mBk} \cdot b_{mCk})$, $X_{31} = \sum_k (r_{mCk} \cdot r_{mAk} + g_{mCk} \cdot g_{mAk} + b_{mCk} \cdot b_{mAk})$, $X_{32} = \sum_k (r_{mCk} \cdot r_{mBk} + g_{mCk} \cdot g_{mBk} + b_{mCk} \cdot b_{mBk})$, $X_{33} = \sum_k (r_{mCk} \cdot r_{mCk} + g_{mCk} \cdot g_{mCk} + b_{mCk} \cdot b_{mCk})$, $Y_1 = \sum_k (r_{mAk} \cdot r_{mk} + g_{mAk} \cdot g_{mk} + b_{mAk} \cdot b_{mk})$, $Y_2 = \sum_k (r_{mBk} \cdot r_{mk} + g_{mBk} \cdot g_{mk} + b_{mBk} \cdot b_{mk})$, $Y_3 = \sum_k (r_{mCk} \cdot r_{mk} + g_{mCk} \cdot g_{mk} + b_{mCk} \cdot b_{mk})$.

The weights $w_A$, $w_B$ and $w_C$ calculated by the light source identification unit 132 are used for the identification of a mixed light source or a single light source to be described below.

(2-4-1. Mixed Light source identification)

A method of using the weights $w_A$, $w_B$ and $w_C$ for the identification of a mixed light source will be explained. This method expresses a light source used in the input image capturing by a mixed light source. In this case, the weights $w_A$, $w_B$ and $w_C$ calculated by the light source identification unit 132 are input into the color correction unit 133. The color correction unit 133 adjusts the correction color using correction color calculated by the color correction unit 133, a correction error described in the error table 111c, and the weights $w_A$, $w_B$ and $w_C$.

For example, the correction color of the input color, a correction error corresponding to light source #1, a correction error corresponding to the light source #2, and a correction error corresponding to the light source #3 are denoted by $(r_m, g_m, b_m)$, $(dR_A, dG_A, dB_A)$, $(dR_B, dG_B, dB_B)$, and $(dR_C, dG_C, dB_C)$, respectively. Note that these correction errors correspond to $(r_m, g_m, b_m)$. In this case, correction colors after the adjustment $(r_M, g_M, b_M)$ are obtained according to the following formula (16). In this manner, by subtracting the correction errors weighted by the weights $w_A$, $w_B$ and $w_C$ from the correction color, it is possible to perform color adjustment depending on a mixed light source.

$$\begin{bmatrix} r_M \\ g_M \\ b_M \end{bmatrix} = \begin{bmatrix} r_m \\ g_m \\ b_m \end{bmatrix} - w_A \begin{bmatrix} dR_A \\ dG_A \\ dB_A \end{bmatrix} - w_B \begin{bmatrix} dR_B \\ dG_B \\ dB_B \end{bmatrix} - w_C \begin{bmatrix} dR_C \\ dG_C \\ dB_C \end{bmatrix} \quad (16)$$

(2-4-2. Single Light Source Identification)

An identification method of a single light source using the weights $w_A$, $w_B$ and $w_C$ will be explained. The light source identification unit 132 having calculated the weights $w_A$, $w_B$ and $w_C$ detects the maximum value of the weights $w_A$, $w_B$ and $w_C$, and identifies a light source corresponding to the detected maximum value as a light source used in the input image capturing. The information of the light source identified by the light source identification unit 132 is input into the color correction unit 133. For example, when the light source #1 is identified, the color correction unit 133, as in the following formula (17), obtains a correction color $(r_M, g_M, b_M)$ after the adjustment by subtracting the correction error $(dR_A, dG_A, dB_A)$ corresponding to the light source #1 from the correction color $(r_m, g_m, b_m)$ of the input color.

$$\begin{bmatrix} r_M \\ g_M \\ b_M \end{bmatrix} = \begin{bmatrix} r_m \\ g_m \\ b_m \end{bmatrix} - \begin{bmatrix} dR_A \\ dG_A \\ dB_A \end{bmatrix} \quad (17)$$

In the above, the light source identification method according to the variation example #2 has been explained.

In the above, the functions of the image processing apparatus 100 have been explained.

(2-5. Processing Flow)

Next, a processing flow carried out by the image processing apparatus 100 will be explained.

(Table Generation)

Figure 13:
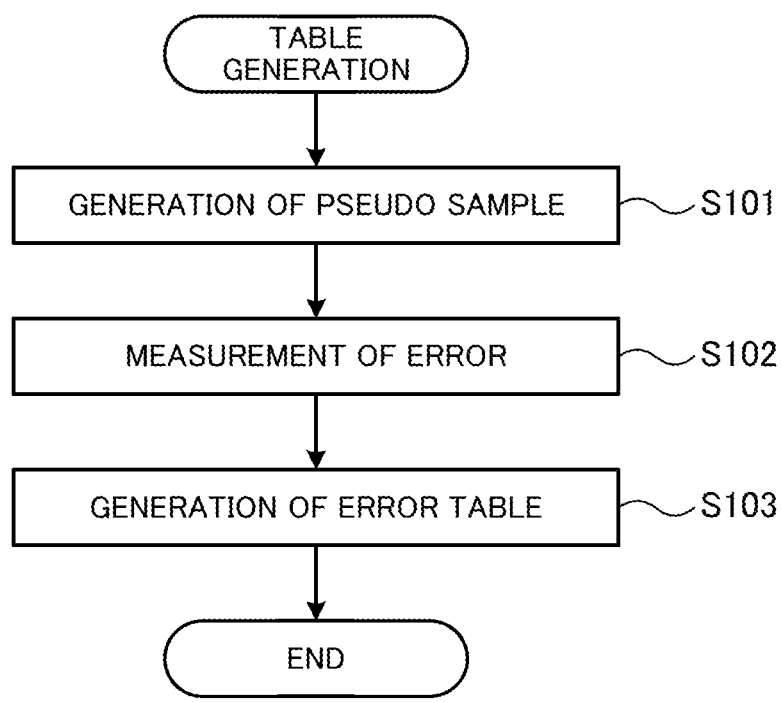
FIG. 13 is a flowchart illustrating a processing flow of table generation according to the second embodiment.

With reference to FIG. 13, a processing flow for the generation of the error table 111c will be explained. FIG. 13 is a flowchart illustrating the processing flow for the table generation according to the second embodiment.

(S101) The sample generation unit 121 generates a pseudo sample which has a specific color under the reference light source. The pseudo sample is obtained by decomposing the spectral reflection characteristics of a plurality of existing samples into vectors corresponding to main components and combining the decomposed vectors linearly.

For example, the spectrum distribution $P(\lambda)$ ($\lambda$: light wavelength) of a light source is assumed to have been preliminarily measured and n samples are assumed to have been prepared as the existing samples. Further, the reflection spectrum characteristics $R_m(\lambda)$ (m=1, . . . , n) of these n samples are assumed to have been measured preliminarily.

The following explanation uses $\{P_{\lambda i}\}$ and $\{R_{m, \lambda i}\}$ which express $P(\lambda)$ and $R_m(\lambda)$, respectively, discretely in terms of the wavelength $\lambda$. Here, m=1, . . . n. For example, when a spectrum of 400 nm to 700 nm is sampled at an interval of 10 nm, 31 sampling data sets $\{R_{n, \lambda i}, \ldots, R_{n, \lambda 31}\}$ are obtained as observation data of the reflection spectrum characteristic.

An average vector, an eigenvalue (or singular value), and an eigenvector (or singular vector) obtained from the reflection spectrum characteristic of the sample observation are $\mu$, $\eta_k$, and $\phi_k$, respectively. Here, k=1, 2, 3. When the number of samples is n, and the reflection spectrum characteristic for each of the samples is expressed by $R_m = [R_{m, \lambda 1} \ldots, R_{m, \lambda n}]^T$ (here, m=1, . . . , n), the average vector $\mu$ is given by the above formula (4).

The sample generation unit 121 generates an n-by-n matrix in which the n vectors $R_m$ are arranged in a row, and obtains the eigenvalue $\eta_k$ and the eigenvector $\phi_k$ from the matrix. Note that, when the number of samples is small and the matrix does not become a square matrix, the sample generation unit 121 performs singular value decomposition on the matrix, and sets a singular value and a left singular vector to be $\eta_k$ and $\eta_k$, respectively.

Further, the sample generation unit 121 generates a matrix S in which the reflection spectrum characteristic $\{R_{n, \lambda 1}, \ldots, R_{n, \lambda n}\}$ of a specific light source are arranged as diagonal elements and the other elements are 0. Here, the sensitivity characteristic $\{r_s, g_s, b_s\}$ of the camera is assumed to have been observed. Here, $r_s = [r_{\lambda 1}, r_{\lambda 2}, \ldots, r_{\lambda n}]^T$, $g_s = [g_{\lambda 1}, g_{\lambda 2}, \ldots, g_{\lambda n}]^T$, and $b_s = [b_{\lambda 1}, b_{\lambda 2}, \ldots, b_{\lambda n}]^T$.

The sample generation unit 121 generates a pseudo sample of a color $[r_x, g_x, b_x]^T$ under the reference light source using the above formula (7). Since the above formula (7) is deformed as in the above formula (8), the sample generation unit 121 calculates parameters $\{\alpha_1, \alpha_2, \alpha_3\}$ by the above formula (8).

By changing the above color $[r_x, g_x, b_x]^T$, it is possible to change a desired color the pseudo sample. Accordingly, the sample generation unit 121 calculates the parameters $\{\alpha_1, \alpha_2, \alpha_3\}$ by the above formula (8) for various colors. Further, it is possible to change the light source by changing the above matrix S. Accordingly, the sample generation unit 121 obtains the colors of the pseudo sample under various light sources by the above formula (5) while changing $[r_x, g_x, b_x]^T$.

(S102) the error measurement unit 122 measures the error.

For example, the error measurement unit 122 calculates an error observed when the reference light source is changed to another light source. How the sample color under the reference light source changes under the another light source is obtained by changing the matrix S to a matrix S for the another light source in the above formula (5) and calculating a color $[r, g, b]^T$ observed under the another light source. For example, the error measurement unit 122 calculates a correction error $\{dR, dG, dB\}$ given by the following formula (10) while changing the matrix S and $[r_x, g_x, b_x]^T$.

For example, when the color coordinates of a sample which has color coordinates (100, 100, 100) under the reference light source are calculated to be (103, 103, 103) under another light source, the error measurement unit 122 calculates (3, 3, 3) from the above formula (10) and stores the calculated result into the error table 111c.

(S103) The error measurement unit 122 generates the error table 111c describing the correction error calculated in S102. Note that the pseudo sample generation by the sample generation unit 121 and the correction error calculation by the error measurement unit 122 are carried out for all the color combinations. Thereby, the error table 111c is generated. When the processing of S103 is completed, a series of processing illustrated in FIG. 13 is finished.

(Image Color Correction)

Figure 14:
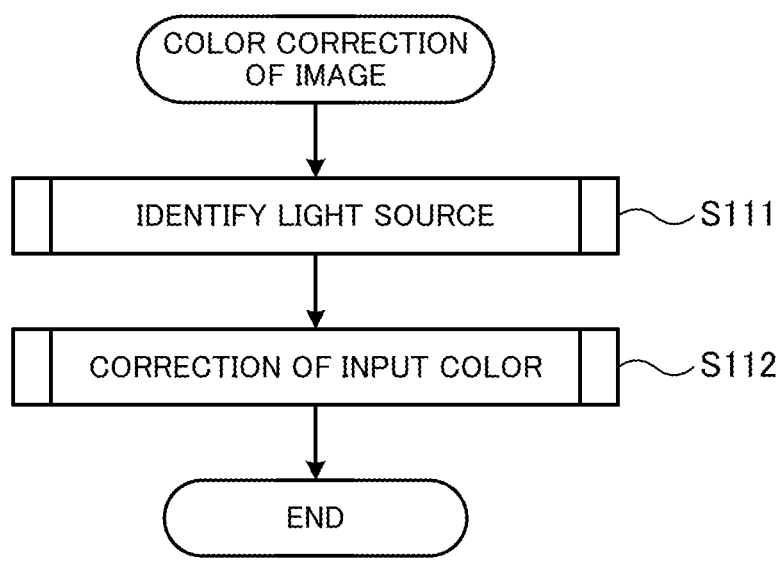
FIG. 14 is a flowchart illustrating a processing flow of color correction of image according to the second embodiment.

Next, with reference to FIG. 14, a processing flow for the image color correction will be explained. FIG. 14 is a flowchart illustrating the processing flow for the image color correction according to the second embodiment.

(S111) The light source identification unit 132 identifies the light source in the input image capturing according to the detection color of the reference color detected from the input image. The processing of S111 will be further explained below with reference to FIG. 15 and the like.

(S112) The color correction unit 133 corrects each of the colors included in the input image by linear interpolation, and adjusts each color after the correction using adjustment values corresponding to the light source identified in S111. The processing of S112 will be further explained below with reference to FIG. 16 and the like. When the processing of S112 is completed, a series of processing illustrated in FIG. 14 is finished.

(Light Source Identification)

Figure 15:
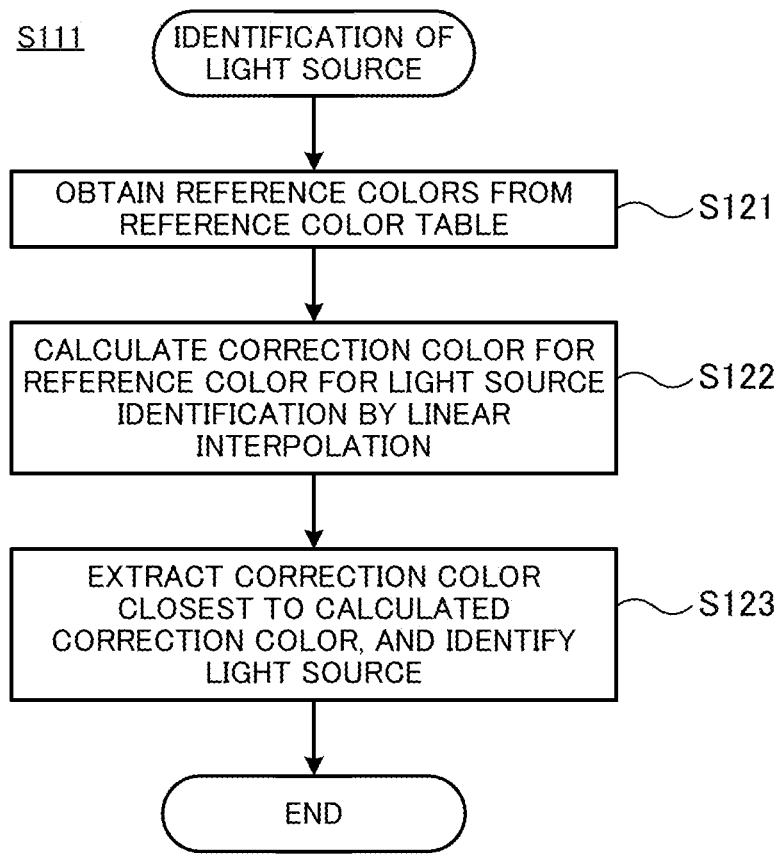
FIG. 15 is a flowchart illustrating a processing flow of identification of light source according to the second embodiment.

Here, with reference to FIG. 15, a processing flow for the light source identification will be further explained. FIG. 15 is a flowchart illustrating the processing flow for the light source identification according to the second embodiment.

(S121) The reference color correction unit 131 obtains the reference color for light source identification and the reference colors for color correction from the reference color table 111a.

(S122) The reference color correction unit 131 calculates the correction color of the reference color for light source identification by linear interpolation. For example, the reference color correction unit 131 detects the detection colors of the reference colors for color correction and the detection color of the reference color for light source identification from the input image, and calculates the correction color of the reference color for light source identification according to the above formulas (1) to (3).

(S123) The light source identification unit 132, with reference to the correction color table 111b, detects a correction color having the color coordinates closest to those of the correction color calculated by the reference color correction unit 131. Then, the light source identification unit 132 identifies a light source corresponding to the correction color detected from the correction color table 111b to be the light source used in the input image capturing.

For example, when the reference color correction unit 131 calculates the correction color for the reference color #5 (refer to FIG. 10), the light source identification unit 132 detects a correction color closest to the correction color calculated by the reference color correction unit 131 among the correction colors corresponding to the reference color #5 described in the correction color table 111b.

For example, when the correction color calculated by the reference color correction unit 131, the correction color of the light source #1, and the correction color of the light source #2 are $(r_{m0}, g_{m0}, b_{m0})$, $(r_{mA}, g_{mA}, b_{mA})$, and $(r_{mB}, g_{mB}, b_{mB})$, respectively, the closest correction color is obtained by the above formula (11). In the example of FIG. 10, the light source #1 is identified as the light source used in the input image capturing. When the processing of S123 is completed, a series of processing illustrated in FIG. 15 is finished.

(Input Color Correction)

Figure 16:
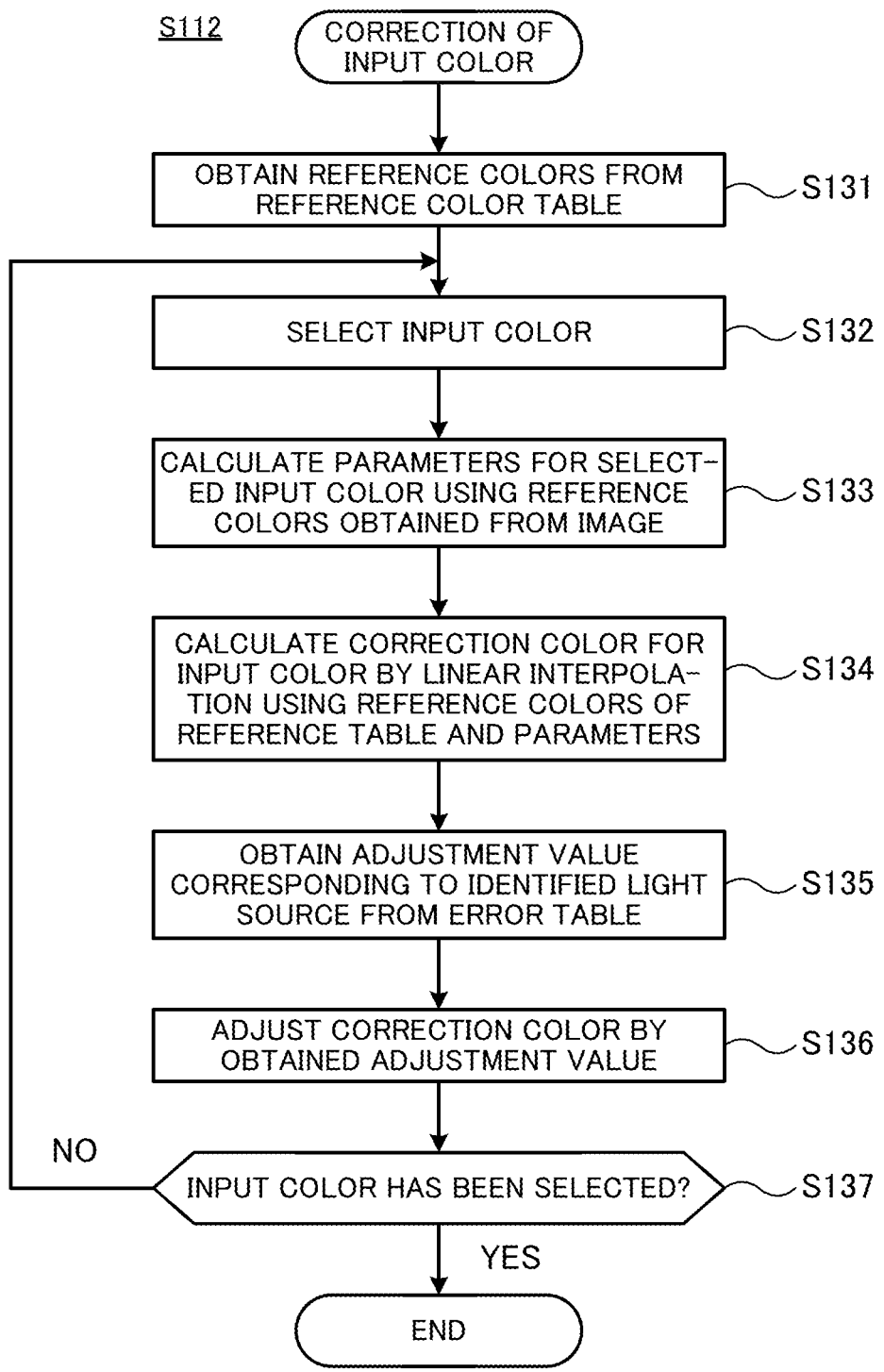
FIG. 16 is a flowchart illustrating a processing flow of correction of input color according to the second embodiment.

Next, with reference to FIG. 16, a processing flow for the input color correction will be further explained. FIG. 16 is a flowchart illustrating the processing flow of the input color correction according to the second embodiment.

(S131) The color correction unit 133 obtains the reference colors for color correction from the reference color table 111a. Further, the color correction unit 133 detects the detection color of each color (input color) included in the input image.

(S132) The color correction unit 133 selects one of the input colors extracted in S131.

(S133) The color correction unit 133 calculates the parameters $h_1$, $h_2$ and $h_3$ for the input color selected in S132 according to a formula which is obtained by replacing the color coordinates $(r_{o5}, g_{o5}, b_{o5})$ of the detection color by the color coordinates $(r_o, g_o, b_o)$ of the detection color for the input color in the above formula (1).

(S134) The color correction unit 133 calculates the correction color of the input color by linear interpolation using the parameters $h_1$, $h_2$ and $h_3$ calculated in S133 and the reference colors obtained in S131. For example, the color correction unit 133 calculates the correction color of the input color according to a formula which is obtained by replacing the color coordinates $(r_{m5}, g_{m5}, b_{m5})$ of the correction color by the color coordinates $(r_m, g_m, b_m)$ of the correction color for the input color in the above formula (3).

(S135) The color correction unit 133 obtains the adjustment values (correction error) for the color coordinates of the correction color which corresponds to the light source identified by the light source identification unit 132, from the error table 111c.

(S136) The color correction unit 133 adjusts the correction color using the adjustment values obtained in S135. That is, the color correction unit 133 adjusts the color coordinates of the correction color so as to compensate a correction error expressed by the adjustment values. For example, it is possible to compensate the correction error by adding a value obtained by inverting a sign for each of the adjustment values to the color coordinates of the correction color.

(S137) The image correction unit 113 determines whether or not all the input colors whose detection colors were detected in S131 have been selected. When the input colors have been selected, a series of processing illustrated in FIG. 16 is finished. When an un-selected input color exists, the process proceeds to S132.

Variation Example #1

Figure 17:
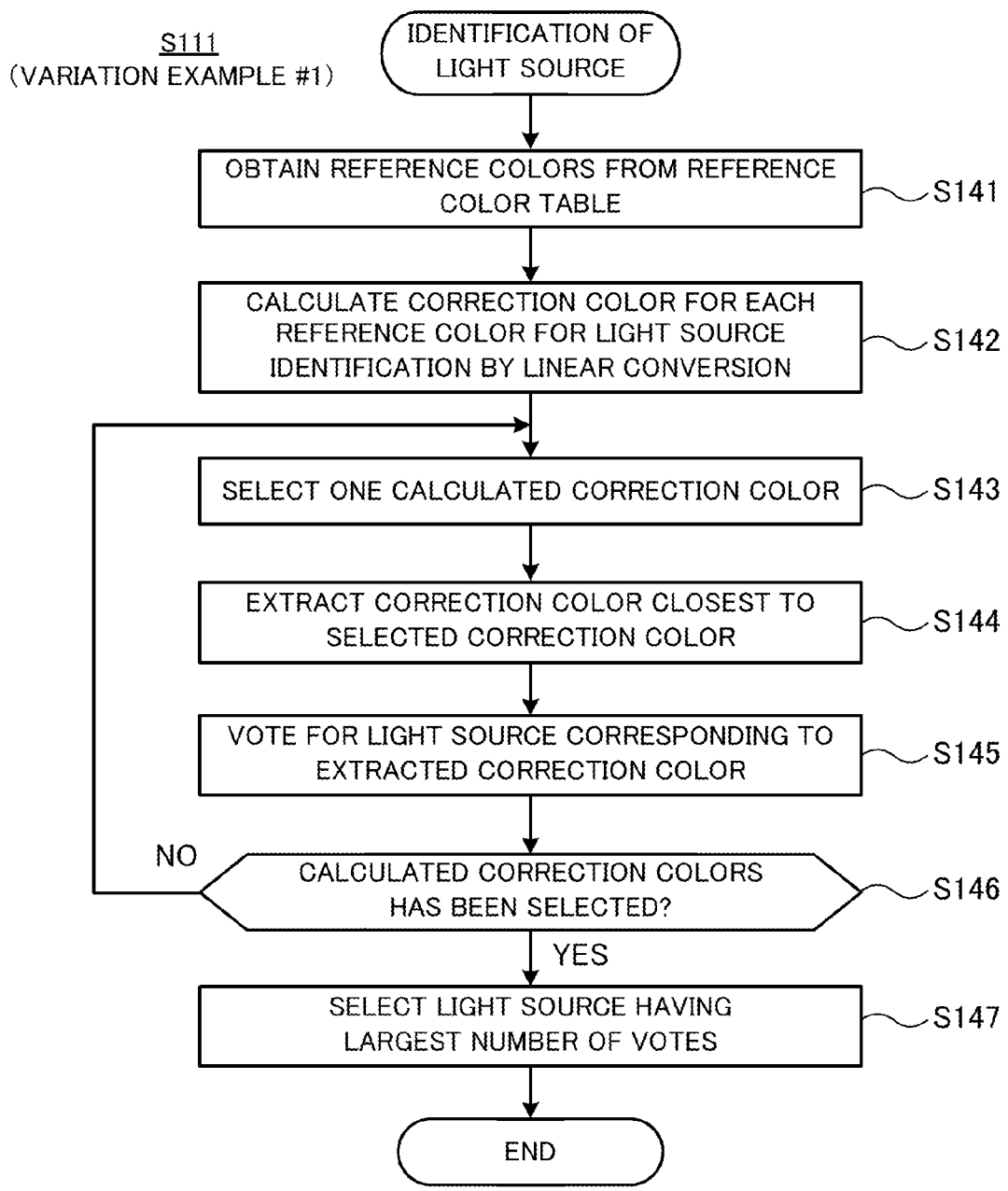
FIG. 17 is a flowchart illustrating a processing flow of identification of light source according to a variation example (variation example #1) of the second embodiment.

Here, with reference to FIG. 17, a variation example (variation example #1) of the second embodiment will be explained. FIG. 17 is a flowchart illustrating a processing flow for the light source identification according to the variation example (variation example #1) of the second embodiment. The variation example #1 modifies the processing flow for the light source identification. Here, the plurality of reference colors for light source identification is set in the variation example #1.

(S141) The reference color correction unit 131 obtains a plurality of reference colors for light source identification and a plurality of reference colors for color correction from the reference color table 111a.

(S142) The reference color correction unit 131 calculates the correction color for each of the reference colors for light source identification by linear conversion (linear interpolation). For example, the reference color correction unit 131 detects the detection colors of the reference colors for color correction and the detection colors of the reference colors for light source identification from the input image, and calculates the correction colors of the reference colors for light source identification according to the above formulas (1) to (3).

(S143) The light source identification unit 132 selects one of the correction colors calculated in S142.

(S144) The light source identification unit 132 extracts a correction color having the color coordinates closest to those of the correction color selected in S143 with reference to the correction color table 111*b*.

(S145) The light source identification unit 132 votes for a light source corresponding to the correction color extracted from the correction color table 111*b*. Note that the voting here means processing of increasing the count value of a counter prepared for each light source.

(S146) The light source identification unit 132 determines whether or not all the correction colors calculated in S142 have been selected. When all the correction colors have been selected, the process proceeds to S147. When an un-selected correction color exists, the process proceeds to S143.

(S147) The light source identification unit 132 selects a light source having the largest number of votes, and identifies the light source to be the light source in the input image capturing. That is, the light source identification unit 132 identifies the light source having the largest count value to be the light source in the input image capturing with reference to the count value of the counter prepared for each light source. When the processing in S147 is completed, a series of processing illustrated in FIG. 17 is finished.

Variation Example #2

Light Source Identification

Figure 18:
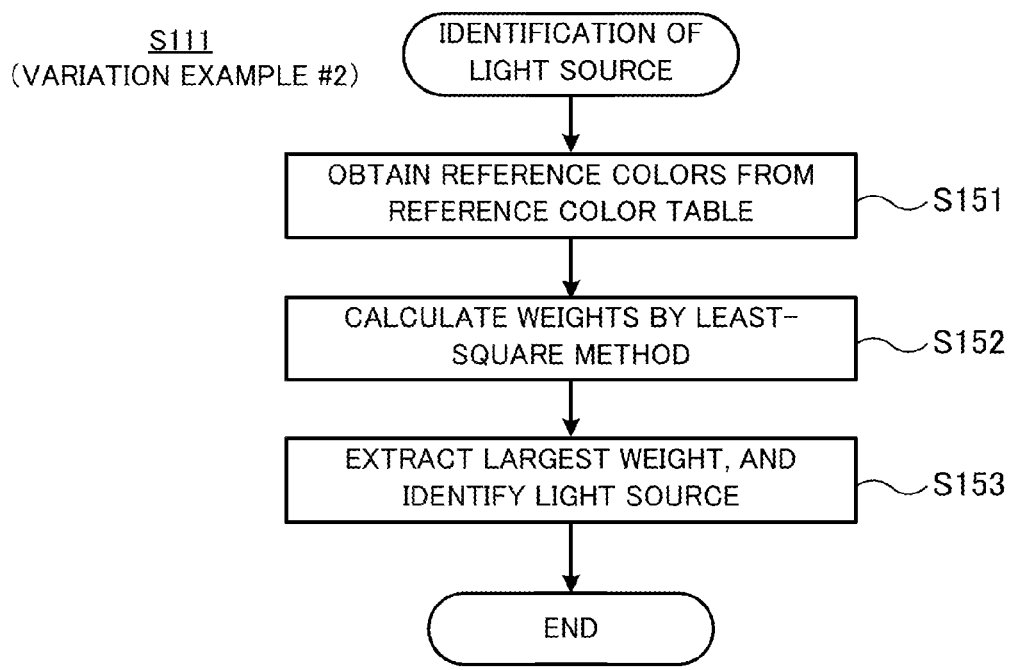
FIG. 18 is a flowchart illustrating a processing flow of identification of light source according to a variation example (variation example #2) of the second embodiment.

Next, with reference to FIG. 18, a method of modifying the processing flow for the light source identification in a variation example (variation example #2) of the second embodiment will be explained. FIG. 18 is a flowchart illustrating a processing flow for the light source identification according to the variation example (variation example #2) of the second embodiment. Here, the light source identification method according to the variation example #2 calculates a mixing ratio of a mixed light source close to the light source in the input image capturing, and identifies a light source according to the mixing ratio.

(S151) The reference color correction unit 131 obtains reference colors for light source identification and reference colors for color correction from the reference color table 111*a*.

(S152) When the light source in the input image capturing is expressed by a mixture of the light sources #1, #2 and #3, the mixing ratio thereof is expressed by the weights $w_A$, $w_B$ and $w_C$. The light source identification unit 132 calculates the weights $w_A$, $w_B$ and $w_C$ using the least-square method.

For example, the correction color ($r_{mk}$, $g_{mk}$, $b_{mk}$) of the reference color #k (k=5, 6, . . . ) is assumed to have been calculated by the reference color correction unit 131. Further, the correction color ($r_{mAk}$, $g_{mAk}$, $b_{mAk}$) of the light source #1, the correction color ($r_{mBk}$, $g_{mBk}$, $b_{mBk}$) of the light source #2, and the correction color ($r_{mCk}$, $g_{mCk}$, $b_{mCk}$) of the light source #3 are assumed to have been calculated corresponding to the reference color #k. In this case, the light source identification unit 132 calculates the weighs $w_A$, $w_B$ and $w_C$ according to the above formula (15) so as to minimize the evaluation formula J expressed in the above formula (14).

(S153) The light source identification unit 132 extracts the maximum weight from the weights calculated in S152, and identifies a light source corresponding to the extracted weight to be the light source in the input image capturing. When the processing in S153 is completed, a series of processing illustrated in FIG. 18 is finished.

Figure 19:
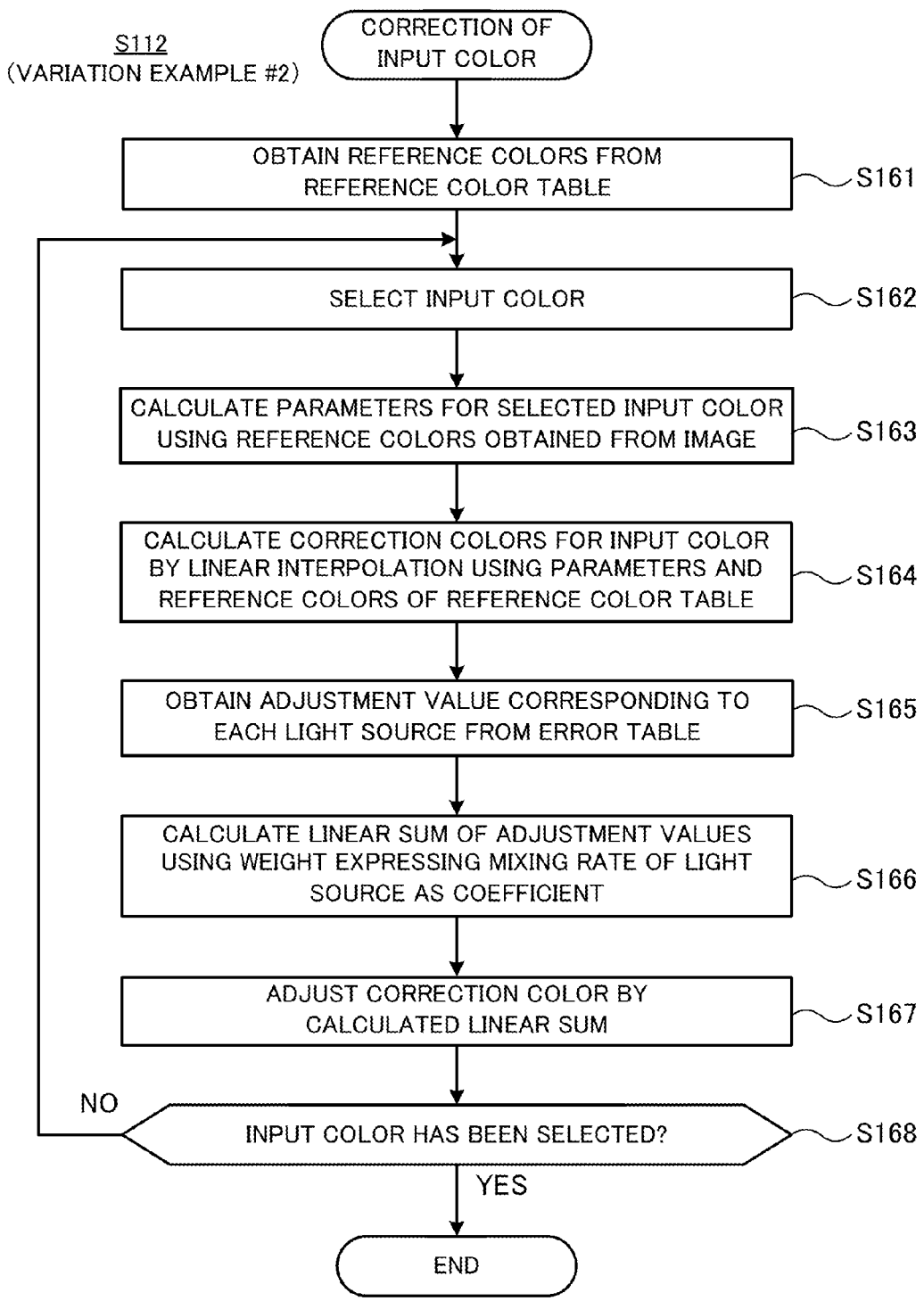
FIG. 19 is a flowchart illustrating a processing flow of correction of input color according to the variation example (variation example #2) of the second embodiment.

Note that, in the example of FIG. 18, one light source (single light source) is identified in the processing of S153. When a single light source is identified, the processing flow for the input color correction is the same as the processing flow illustrated in FIG. 16. Meanwhile, a mixed light source having the mixing ratio corresponding to the weights calculated in S152 may be identified to be the light source in the input image capturing. In this case, the weights calculated in S152 are used in the correction of the input color as illustrated in FIG. 19.

Variation Example #2

Input Color Correction

Here, with reference to FIG. 19, in the processing for the input color correction according to the variation example #2, a processing flow will be explained when the mixed light source is identified. FIG. 19 is a flowchart illustrating the processing flow for the input color correction according to the variation example (variation example #2) of the second embodiment.

(S161) The color correction unit 133 obtains reference colors for color correction from the reference color table 111*a*. Further, the color correction unit 133 detects a detection color for each color (input colors) included in the input image.

(S162) The color correction unit 133 selects one of the input colors extracted in S161.

(S163) The color correction unit 133 calculates the parameters h, $h_2$ and $h_3$ for the input color selected in S162 according to a formula which is obtained by replacing the color coordinates ($r_{o5}$, $g_{o5}$, $b_{o5}$) of the detection color by the color coordinate ($r_o$, $g_o$, $b_o$) of the detection color for the input color in the above formula (1).

(S164) The color correction unit 133 calculates the correction color of the input color by linear interpolation using the parameters $h_1$, $h_2$ and $h_3$ calculated in S163 and the reference colors obtained in S161. For example, the color correction unit 133 calculates the correction color of the input color according to a formula obtained by replacing the color coordinates ($r_{m5}$, $g_{m5}$, $b_{m5}$) of the correction color by the color coordinates ($r_m$, $g_m$, $b_m$) of the correction color for the input color in the above formula (3).

(S165) The color correction unit 133 obtains adjustment values (correction error) for the color coordinates of the correction color corresponding to each of the light sources from the error table 111*c*.

(S166) The color correction unit 133 calculates a linear sum of the adjusting values using the weights expressing the mixing ratio of the light sources as coefficients. For example, the correction color ($r_m$, $g_m$, $b_m$) of the input color, a correction error ($dR_A$, $dG_A$, $dB_A$) for the light source #1, a correction error ($dR_B$, $dG_B$, $dB_B$) corresponding to the light source #2, and a correction error ($dR_C$, $dG_C$, $dB_C$) corresponding to the light source #3 are assumed to have been obtained. In this case, the color correction unit 133 calculates a linear sum expressed by the following formula (18).

This linear sum corresponds to a formula obtained by inverting a sign from the second term to the fourth term on the right side in the above formula (16).

$$w_A \begin{bmatrix} dR_A \\ dG_A \\ dB_A \end{bmatrix} + w_B \begin{bmatrix} dR_B \\ dG_B \\ dB_B \end{bmatrix} + w_C \begin{bmatrix} dR_C \\ dG_C \\ dB_C \end{bmatrix} \quad (18)$$

(S167) The color correction unit 133 adjusts the correction color using the linear sum calculated in S166. For example, the color correction unit 133 inverts the sign of the linear sum calculated in S166, and adjusts the correction color by adding the inverted linear sum to the correction color $(r_m, g_m, b_m)$ of the input color. That is, the color correction unit 133 calculates $(r_m, g_m, b_m)$ using the above formula (16). In this manner, by adding the sign-inverted value of the linear sum to the color coordinates of the correction color, it is possible to compensate the correction error.

(S168) The image correction unit 113 determines whether or not all the input colors whose detection colors were detected in S161 have been selected. When the input colors have been selected, a series of processing illustrated in FIG. 19 is finished. When an un-selected input color exists, the process proceeds to S162.

In the above, the processing flows carried out by the image processing apparatus 100 have been explained.

In the above, the second embodiment has been explained.

<3. Third Embodiment>

Next, a third embodiment will be explained. While the second embodiment employs the method of identifying a light source using the reference colors for light source identification, the third embodiment employs a method of identifying the light source using the reference colors for color correction.

Note that a difference of the third embodiment from the second embodiment is mainly in processing for the light source identification, and the technique of the second embodiment may be applied to other points of the third embodiment. Accordingly, the processing for the light source identification will be explained in the following, and duplicated explanation of the already explained contents will be omitted.

(Reference Color Feature Table)

The storage unit 111 of the image processing apparatus 100 according to the third embodiment stores a reference color feature table 201. Here, with reference to FIG. 20, the reference color feature table 201 will be explained. FIG. 20 illustrates an example of the reference color feature table according to the third embodiment.

As illustrated in FIG. 20, the reference color feature table 201 associates the kind of a light source and a color feature with each other. The color feature here is information to define the shape of a solid with the color coordinates of the reference colors as apexes. The shape of the solid with the color coordinates of the reference colors as the apexes changes depending on a light source difference. Accordingly, it is possible to use the information to define the shape of the solid for the light source identification. For example, a feature amount to define a positional relationship between the reference colors becomes the color feature.

As examples of the kinds of light sources, FIG. 20 illustrates the light sources #1, #2 and #3 and illustrates color features CZ1, CZ2 and CZ3 as examples of the color feature. The color features CZ1, CZ2 and CZ3 are vectors normalized from vectors CV1, CV2 and CV3 connecting the reference colors in the color space. The vectors connecting the reference colors in the color space are information to define the shape of the solid with the color coordinates of the reference colors as the apexes, and are applicable to the light source identification.

For example, the reference color having the color coordinates $(r_0^{\#1}, g_0^{\#1}, b_0^{\#1})$ under the light source #1 is assumed to be imaged having the color coordinates $(r_0^{\#2}, g_0^{\#2}, b_0^{\#2})$ under the light source #2, and having the color coordinates $(r_0^{\#3}, g_0^{\#3}, b_0^{\#3})$ under the light source #3. Further, the reference color having the color coordinates $(r_1^{\#1}, g_1^{\#1}, b_1^{\#1})$ under the light source #1 is assumed to be imaged having the color coordinates $(r_1^{\#2}, g_{1\#2}, b_1^{\#2})$ under the light source #2, and having the color coordinates $(r_1^{\#3}, g_1^{\#3}, b_1^{\#3})$ under the light source #3.

The vector CV1 connecting the above two reference colors is given by the following formula (19), for example. Here, $CV1^{\#1}$ is a vector to connect the above two reference colors under the light source #1, $CV1^{\#2}$ is a vector to connect the above two reference colors under the light source #2, and $CV1^{\#3}$ is a vector to connect the above two reference colors under the light source #3.

$$CV1^{\#1} = (r_{01}^{\#1}, g_{01}^{\#1}, b_{01}^{\#1})^T = (r_1^{\#1} - r_0^{\#1}, g_1^{\#1} - g_0^{\#1}, b_1^{\#1} - b_0^{\#1})^T$$

$$CV1^{\#2} = (r_{01}^{\#2}, g_{01}^{\#2}, b_{01}^{\#2})^T = (r_1^{\#2} - r_0^{\#2}, g_1^{\#2} - g_0^{\#2}, b_1^{\#2} - b_0^{\#2})^T$$

$$CV1^{\#1} = (r_{01}^{\#3}, g_{01}^{\#3}, b_{01}^{\#3})^T = (r_1^{\#3} - r_0^{\#3}, g_1^{\#3} - g_0^{\#3}, b_1^{\#3} - b_0^{\#3})^T \quad (19)$$

The above $CV1^{\#1}$, $CV1^{\#2}$ and $CV1^{\#3}$ may be used as the color features without change. Here, however, the normalized vectors are used as the color features as expressed in the following formula (20). Here, $Z_{01}^{\#1}$, $Z_{01}^{\#2}$ and $Z_{01}^{\#3}$ included in the following formula (20) are given by the following formula (21). The table generation unit 112 stores vectors $CZ1^{\#1}$, $CZ1^{\#2}$ and $CZ1^{\#3}$ calculated according to the following formulas (20) and (21) into the reference color feature table 201 as the color features.

$$CZ1^{\#1} = CV1^{\#1}/Z_{01}^{\#1}$$

$$CZ1^{\#2} = CV1^{\#2}/Z_{01}^{\#2}$$

$$CZ1^{\#3} = CV1^{\#3}/Z_{01}^{\#3} \quad (20)$$

$$Z_{01}^{\#1} = |CV1^{\#1}|$$

$$Z_{01}^{\#2} = |CV1^{\#2}|$$

$$Z_{01}^{\#3} = |CV1^{\#3}| \quad (21)$$

The above formulas (20) and (21) are formulas to normalize the length of the vector to one. Note that the length of the vector may be normalized to a value except one. FIG. 20 illustrates an example of the reference color feature table 201 when the length of the vector is normalized to 30. In this example, in the color feature CZ1, the color feature CZ1 corresponding to the light source #1 is (30, 0, 0), the color feature $CZ1^{\#2}$ corresponding to the light source #2 is (27, 5, 0), and the color feature $CZ1^{\#3}$ corresponding to the light source #3 is (27, −5, 0).

Similarly, the table generation unit 112 calculates the color features CZ2 and CZ3. For example, the color features CZ2 and CZ3 are given by the following formulas (22) and (23).

As above, in the example of FIG. 20, the length of the vector is normalized to 30. In the example of FIG. 20, a color feature $CZ2^{\#1}$ corresponding to the light source #1 is (0, 30, 0), a color feature $CZ2^{\#2}$ corresponding to the light source #2 is (0, 28, 3), and a color feature $CZ2^{\#3}$ corresponding to the light source #3 is (0, 25, −7). Further, a color feature $CZ3^{\#1}$ corresponding to the light source #1 is (0, 0, 30), a color feature $CZ3^{\#2}$ corresponding to the light source #2 is (0, 8, 25), and a color feature $CZ3^{\#3}$ corresponding to the light source #3 is (0, −5, 27).

$$CV2^{\#1}=(r_{02}^{\#1},g_{02}^{\#1},b_{02}^{\#1})^T=(r_2^{\#1}-r_0^{\#1},g_2^{\#1}-g_0^{\#1},b_2^{\#1}-b_0^{\#1})^T$$

$$CV2^{\#2}=(r_{02}^{\#2},g_{02}^{\#2},b_{02}^{\#2})^T=(r_2^{\#2}-r_0^{\#2},g_2^{\#2}-g_0^{\#2},b_2^{\#2}-b_0^{\#1})^T$$

$$CV2^{\#3}=(r_{02}^{\#3},g_{02}^{\#3},b_{02}^{\#3})^T=(r_2^{\#3}-r_0^{\#3},g_2^{\#3}-g_0^{\#3},b_2^{\#3}-b_0^{\#3})^T$$

$$CV3^{\#1}=(r_{12}^{\#1},g_{12}^{\#1},b_{12}^{\#1})^T=(r_2^{\#1}-r_1^{\#1},g_2^{\#1}-g_1^{\#1},b_2^{\#1}-b_1^{\#1})^T$$

$$CV3^{\#2}=(r_{12}^{\#2},g_{12}^{\#2},b_{12}^{\#2})^T=(r_2^{\#2}-r_1^{\#2},g_2^{\#2}-g_1^{\#2},b_2^{\#2}-b_1^{\#2})^T$$

$$CV3^{\#3}=(r_{12}^{\#3},g_{12}^{\#3},b_{12}^{\#3})^T=(r_2^{\#3}-r_1^{\#3},g_2^{\#3}-g_1^{\#3},b_2^{\#3}-b_1^{\#3})^T \quad (22)$$

$$CZ2^{\#1}=CV2^{\#1}/Z_{02}^{\#1}$$

$$CZ2^{\#2}=CV2^{\#2}/Z_{02}^{\#2}$$

$$CZ2^{\#3}=CV2^{\#3}/Z_{02}^{\#3}$$

$$CZ3^{\#1}=CV3^{\#1}/Z_{12}^{\#1}$$

$$CZ3^{\#2}=CV3^{\#2}/Z_{12}^{\#2}$$

$$CZ3^{\#3}=CV3^{\#3}/Z_{12}^{\#3} \quad (23)$$

$$Z_{02}^{\#1}=|CV2^{\#1}|$$

$$Z_{02}^{\#2}=|CV2^{\#2}|$$

$$Z_{02}^{\#3}=|CV2^{\#3}|$$

$$Z_{12}^{\#1}=|CV3^{\#1}|$$

$$Z_{12}^{\#2}=|CV3^{\#2}|$$

$$Z_{12}^{\#3}=|CV3^{\#3}| \quad (24)$$

Note that, while the three kinds of color feature CZ1, CZ2 and CZ3 are obtained for each of the light sources in the above example, the number of color feature kinds may be not larger than two or may be not smaller than four. Further, the combination of the reference colors to define each of the vectors may be set optionally.

Figure 21:
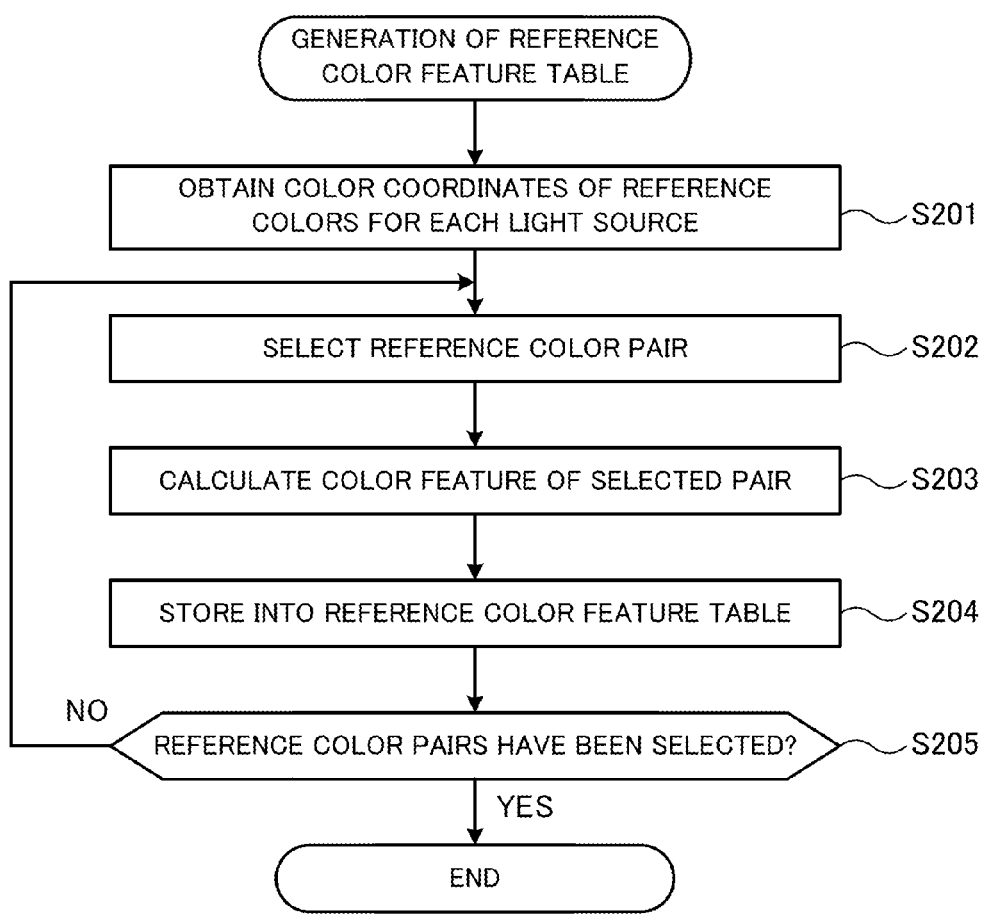
FIG. 21 is a flowchart illustrating a processing flow for the generation of reference color feature table according to the third embodiment.

Here, with reference to FIG. 21, a processing flow for the generation of the reference color feature table 201 will be explained. FIG. 21 is a flowchart illustrating the processing flow for the generation of the reference color feature table according to the third embodiment.

(S201) The table generation unit 112 obtains the color coordinates of reference colors for each of the light sources. For example, the table generation unit 112 obtains the color coordinates of the reference colors under the reference light source from the reference color table 111a. Further, the table generation unit 112 calculates the color coordinates of the reference colors under a light source different from the reference light source for the reference colors whose color coordinates are obtained from the reference color table 111a by the pseudo sample generation method.

(S202) The table generation unit 112 selects a reference color pair by combining the reference colors obtained in S201.

(S203) The table generation unit 112 calculates the color feature of the pair selected in S202. For example, the table generation unit 112 calculates a vector to connect the selected reference color pair as in the above formula (19). Then, the table generation unit 112 calculates a color feature by normalizing the vector as in the above formulas (20) and (21).

(S204) The table generation unit 112 stores the color feature calculated in S203 into the reference color feature table 201.

(S205) The table generation unit 112 determines whether or not the reference color pairs have been selected. For example, when the number of pairs to be selected is set, the table generation unit 112 determines whether or not the set number of pairs has been selected. Further, when all the pairs are selected for the reference colors obtained in S201, the table generation unit 112 determines whether or not all the pairs have been selected. When the reference color pairs have been selected, a series of processing illustrated in FIG. 21 is finished. When the reference color pairs have not been selected, the process proceeds to S202.

In the above, the reference color feature table 201 has been explained.

(Light source identification)

Figure 22:
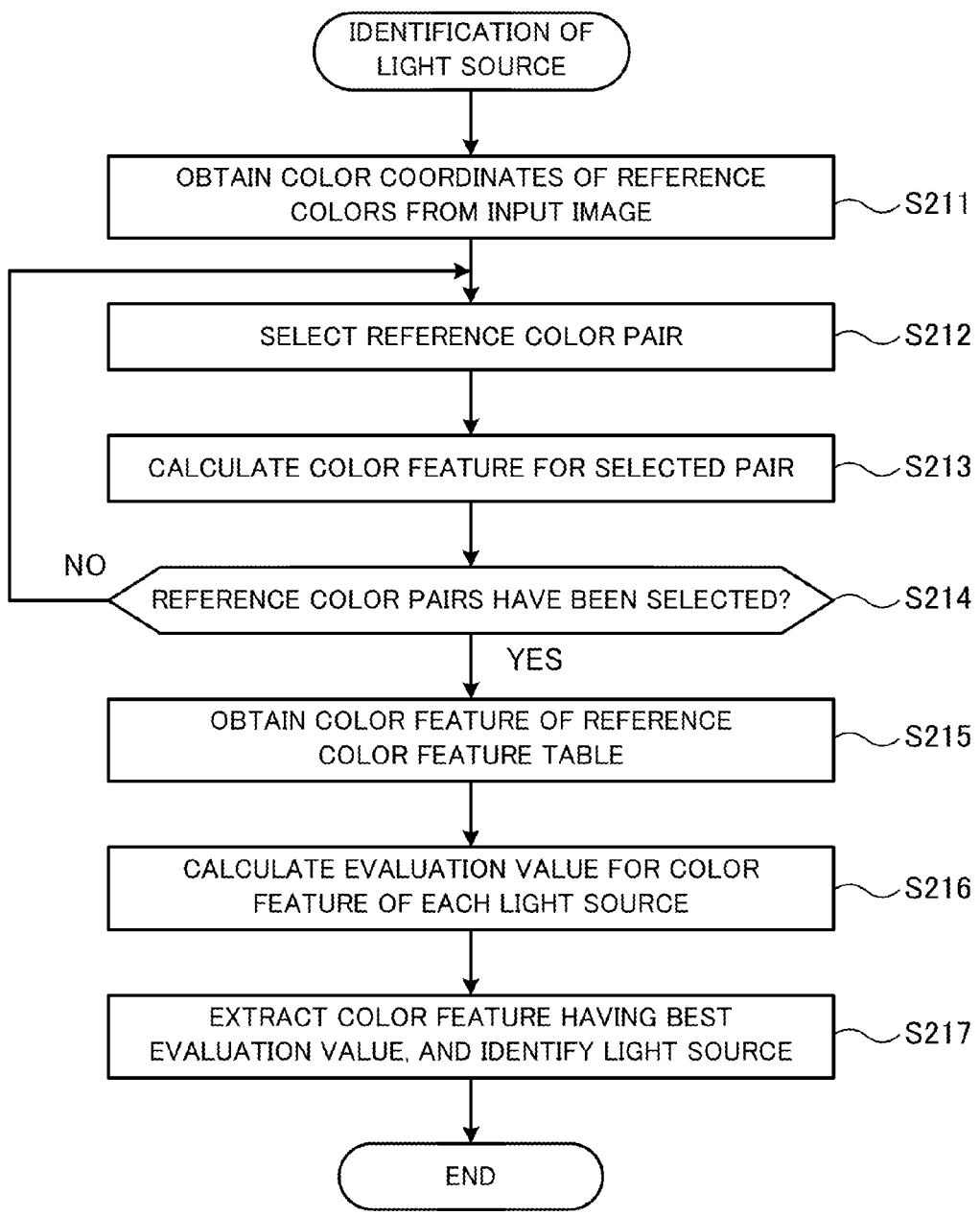
FIG. 22 is a flowchart illustrating a processing flow of identifying a light source according to the third embodiment.

Next, with reference to FIG. 22, a processing flow for the light source identification will be explained. FIG. 22 is a flowchart illustrating the processing flow for the light source identification according to the third embodiment.

(S211) The light source identification unit 132 obtains the color coordinates of reference colors from the input image.

(S212) The light source identification unit 132 selects one pair of reference colors combining the reference colors obtained in S211. Note that the reference color pair selected here is the same combination as any one of the pairs of reference colors used for the calculation of the color feature included in the reference color feature table 201.

(S213) The light source identification unit 132 calculates the color feature of the pair selected in S212. At this time, the light source identification unit 132 calculates the color feature by the same method as in the calculation carried out by the table generation unit 112 in the generation of the reference color featured table 201.

For example, a reference color having color coordinates $(r_0^{\#1}, g_0^{\#1}, b_0^{\#1})$ under the light source #1 is assumed to have color coordinates $(r_0^{(obs)}, g_0^{(obs)}, b_0^{(obs)})$ in the input image. Further, a reference color having color coordinates $(r_1^{\#1}, g_1^{\#1}, b_1^{\#1})$ under the light source #1 is assumed to have color coordinates $(r_1^{(obs)}, g_1^{(obs)}, b_1^{(obs)})$ in the input image. Further, a reference color having color coordinates $(r_2^{\#1}, g_2^{\#1}, b_2^{\#1})$ under the light source #1 is assumed to have color coordinates $(r_2^{(obs)}, g_2^{(obs)}, b_2^{(obs)})$ in the input image.

For the input image, vectors $CV1^{(obs)}$ and $CV2^{(obs)}$ connecting the reference colors are given by the following formula (25), for example. Further, color features $CZ1^{(obs)}$ and $CZ2^{(obs)}$ obtained by the normalization are given by the following formulas (26) and (27). In this case, the light source identification unit 132 calculates the color features $CZ1^{(obs)}$ and $CZ2^{(obs)}$ using the following formulas (25), (26) and (27). Note that, while the length of the vector is normalized to one by the following formulas (26) and (27), the light source identification unit 132 adjusts the length of the vector after the normalization according to the color feature described in the reference color feature table 201.

$$CV1^{(obs)} = (r_{01}^{(obs)}, g_{01}^{(obs)}, b_{01}^{(obs)})^T = (r_1^{(obs)} - r_0^{(obs)}, g_1^{(obs)} - g_0^{(obs)}, b_1^{(obs)} - b_0^{(obs)})^T$$

$$CV2^{(obs)} = (r_{02}^{(obs)}, g_{02}^{(obs)}, b_{02}^{(obs)})^T = (r_2^{(obs)} - r_0^{(obs)}, g_2^{(obs)} - g_0^{(obs)}, b_2^{(obs)} - b_0^{(obs)})^T \quad (25)$$

$$CZ1^{(obs)} = CV1^{(obs)}/Z_{01}^{(obs)}$$

$$CZ2^{(obs)} = CV2^{(obs)}/Z_{02}^{(obs)} \quad (26)$$

$$Z_{01}^{(obs)} = |CV1^{(obs)}|$$

$$Z_{02}^{(obs)} = |CV2^{(obs)}| \quad (27)$$

(S214) The light source identification unit 132 determines whether or not the reference color pair has been selected. For example, when the number of pairs to be selected is set, the light source identification unit 132 determines whether or not the set number of pairs has been selected. Further, when all the pairs of reference colors used in the calculation of the color features included in the reference color feature table 201 are set to be selected, the light source identification unit 132 determines whether or not all the pairs have been selected. When the pairs of reference colors have been selected, the process proceeds to S215. When the pairs have not been selected, the process proceeds to S212.

(S215) The light source identification unit 132 obtains a color feature corresponding to the reference color pair selected in S212 from the reference color feature table 201. For example, when the color feature has been calculated in S213 for the reference color pair corresponding to the above color feature CZ1, the light source identification unit 132 obtains a color feature corresponding to each of the light sources from the reference color feature table 201 for the color feature CZ1.

(S216) The light source identification unit 132 calculates an evaluation value using the color feature calculated in S213 and the color feature obtained in S215 for each of the light sources. As the evaluation value, the light source identification unit 132 uses an inner product of the vectors expressing the color features, a difference absolute value of the vectors, or the like.

When the inner product is used, the light source identification unit 132 calculates vector inner products $J1^{\#1}$, $J1^{\#2}$ and $J1^{\#3}$ using the following formula (28). When the inner product is used as the evaluation value, the evaluation value becomes larger as the similarity between the vectors is higher. That is, when the characteristics of the two light sources which correspond to the two vectors used for the inner product are closer to each other, the evaluation value becomes larger.

$$J1^{\#1} = CZ1^{\#1} \cdot CZ1^{(obs)}$$

$$J1^{\#2} = CZ1^{\#2} \cdot CZ1^{(obs)}$$

$$J1^{\#3} = CZ1^{\#3} \cdot CZ1^{(obs)} \quad (28)$$

Further, when the difference absolute value of the vectors is used, the light source identification unit 132 calculates difference absolute values $AJ1^{\#1}$, $AJ1^{\#2}$ and $AJ1^{\#3}$ using the following formula (29). Here, the difference absolute values $AJ1^{\#1}$, $AJ1^{\#2}$ and $AJ1^{\#3}$ are used as the evaluation values when the vector CV1 is used without normalization. When the difference evaluation value is used as the evaluation value, the evaluation value becomes smaller as the similarity between the vectors is higher. That is, the evaluation value becomes smaller when the characteristics of the two light sources which correspond to the two vectors for the difference calculation are closer to each other.

$$AJ1^{\#1} = |CZ1^{\#1} - CZ1^{(obs)}| \quad (29)$$
$$= \sqrt{\left(r_{01}^{\#1} - r_{01}^{(obs)}\right)^2 + \left(g_{01}^{\#1} - g_{01}^{(obs)}\right)^2 + \left(b_{01}^{\#1} - b_{01}^{(obs)}\right)^2}$$

$$AJ1^{\#2} = |CZ1^{\#2} - CZ1^{(obs)}|$$
$$= \sqrt{\left(r_{01}^{\#2} - r_{01}^{(obs)}\right)^2 + \left(g_{01}^{\#2} - g_{01}^{(obs)}\right)^2 + \left(b_{01}^{\#2} - b_{01}^{(obs)}\right)^2}$$

$$AJ1^{\#3} = |CZ1^{\#3} - CZ1^{(obs)}|$$
$$= \sqrt{\left(r_{01}^{\#3} - r_{01}^{(obs)}\right)^2 + \left(g_{01}^{\#3} - g_{01}^{(obs)}\right)^2 + \left(b_{01}^{\#3} - b_{01}^{(obs)}\right)^2}$$

Similarly for the color feature CZ2, the light source identification unit 132 calculates evaluation values $J2^{\#1}$, $J2^{\#2}$ and $J2^{\#3}$, or $AJ2^{\#1}$, $AJ2^{\#2}$ and $AJ2^{\#3}$ and uses evaluation value sums for the respective light sources $J^{\#1}$, $J^{\#2}$ and $J^{\#3}$ as the evaluation values. Here, $J^{\#1} = (J1_{1\#} + J2^{\#1})$, $J^{\#2} = (J1^{\#2} + J2^{\#2})$, and $J^{\#3} = (J1^{\#3} + J2^{\#3})$, or $J^{\#1} = (AJ1^{\#1} + AJ2^{\#1})$, $J^{\#2} = (AJ1^{\#2} + AJ2^{\#2})$, and $J^{\#3} = (AJ1^{\#3} + AJ2^{\#3})$.

(S217) The light source identification unit 132 extracts a color feature taking the best value in the evaluation values calculated in S216, and identifies a light source corresponding to the extracted color feature to be the light source in the input image capturing. Here, the best evaluation value means that the evaluation value is largest when the above inner product is used as the evaluation value, and the evaluation value is smallest when the above difference absolute value is used as the evaluation value. When the processing in S217 is completed, a series of processing illustrated in FIG. 22 is finished.

(Mixed Light source identification)

Here, with reference to FIG. 23, a processing flow for the mixed light source identification will be explained. FIG. 23 is a flowchart illustrating the processing flow for the mixed light source identification according to the third embodiment.

(S221) The light source identification unit 132 obtains the color coordinates of reference colors from the input image.

(S222) The light source identification unit 132 selects one pair of reference colors combining the reference colors whose color coordinates have been obtained in S221. Note that the reference color pair selected here is the same combination as any one of the reference color pairs used in the calculation of the color feature included in the reference color feature table 201.

(S223) The light source identification unit 132 calculates the color feature of the pair selected in S222. At this time, the light source identification unit 132 calculates the color feature using the same method as in the calculation carried out by the table generation unit 112 in the generation of the reference color feature table 201.

For example, a reference color having color coordinates $(r_0^{\#1}, g_0^{\#1}, b_0^{\#1})$ under the light source #1 is assumed to have color coordinates $(r_0^{(obs)}, g_0^{(obs)}, b_0^{(obs)})$ in the input image. Further, a reference color having color coordinates $(r_1^{\#1}, g_1^{190\ 1}, b_1^{190\ 1})$ under the light source #1 is assumed to have color coordinates $(r_1^{(obs)}, g_1^{(obs)}, b_1^{(obs)})$ in the input image. Further, a reference color having color coordinates $(r_2^{\#1}, g_2^{\#1}, b_2^{\#1})$ under the light source #1 is assumed to have color coordinates $(r_2^{(obs)}, g_2^{(obs)}, b_2^{(obs)})$ in the input image.

For the input image, vectors $CV1^{(obs)}$ and $CV2^{(obs)}$ connecting the reference colors are given by the following formula (25), for example. Further, color features $CZ1^{(obs)}$ and $CZ2^{(obs)}$ obtained by normalization are given by the above formulas (26) and (27). In this case, the light source identification unit 132 calculates the color features $CZ1^{(obs)}$ and $CZ2^{(obs)}$ using the above formulas (25), (26) and (27). Note that, while the length of the vector is normalized to one by the above formulas (26) and (27), the light source identification unit 132 adjusts the length of the vector after the normalization according to the color feature described in the reference color feature table 201.

(S224) The light source identification unit 132 determines whether or not the reference color pair has been selected. For example, when the number of pairs to be selected is set, the light source identification unit 132 determines whether or not the set number of pairs has been selected. Further, when all the pairs of reference colors used in the calculation of the color features included in the reference color feature table 201 are set to be selected, the light source identification unit 132 determines whether or not all the pairs have been selected. When the pairs of reference colors have been selected, the process proceeds to S225. When the pairs have not been selected, the process proceeds to S222.

(S225) The light source identification unit 132 obtains a color feature corresponding to the reference color pair selected in S222 from the reference color feature table 201. For example, when the color feature is calculated in S223 for the reference color pair corresponding to the above color feature CZ1, the light source identification unit 132 obtains a color feature corresponding to each of the light sources from the reference color feature table 201 for the color feature CZ1.

(S226) The light source identification unit 132 calculates an evaluation value using the color feature calculated in S223 and the color feature obtained in S225 for each light source. As the evaluation value, the light source identification unit 132 uses an inner product of the vectors expressing the color features, a difference absolute value of the vectors, or the like.

When the inner product is used, the light source identification unit 132 calculates vector inner products $J1^{\#1}$, $J1^{\#2}$ and $J1^{\#3}$ using the above formula (28). When the inner product is used as the evaluation value, the evaluation value becomes larger as the similarity between the vectors is higher. That is, when the characteristics of the two light sources which correspond to the two vectors used for the inner product are closer to each other, the evaluation value becomes larger.

Further, when the difference absolute value of the vectors is used, the light source identification unit 132 calculates difference absolute values $AJ^{\#}1^{1}$, $AJ1^{\#2}$ and $AJ1^{\#3}$ using the above formula (29). Here, the difference absolute values $AJ1^{\#1}$, $AJ1^{\#2}$ and $AJ1^{\#3}$ are used as the evaluation values when the vector CV1 is used without normalization. When the difference evaluation value is used as the evaluation value, the evaluation value becomes smaller as the similarity between the vectors is higher. That is, the evaluation value becomes smaller when the characteristics of the two light sources corresponding to the two vectors for the difference calculation are closer to each other.

Similarly for the color feature CZ2, the light source identification unit 132 calculates evaluation values $J2^{\#1}$, $J2^{\#2}$ and $J2^{\#3}$, or $AJ2^{\#1}$, $AJ2^{\#2}$ and $AJ2^{\#3}$, and uses evaluation value sums for the respective light sources $J^{\#1}$, $J^{\#2}$ and $J^{\#3}$ as the evaluation values. Here, $J^{\#1}=(J1^{\#1}+J2^{\#1})$, $J^{\#2}=(J1^{\#2}+J2^{\#2})$, and $J^{\#2}=(J1^{\#3}+J2^{\#3})$, or $J^{\#1}=(AJ1^{\#1}+AJ2^{\#1})$, $J^{\#2}=(AJ1^{\#2}+AJ2^{\#2})$, and $J^{\#3}=(AJ1^{\#3}+AJ2^{\#3})$.

(S227) The light source identification unit 132 totals the evaluation values calculated in S226 for the respective light sources. For example, the light source identification unit 132 calculates $J^{ALL}$ ($J^{ALL}=J^{\#1}+J^{\#2}+J^{\#3}$). Then, the light source identification unit 132 calculates mixing ratio, $w_A$, $w_B$ and $w_C$, of the light sources according to the following formula (30). When the processing in S227 is completed, a series of processing illustrated in FIG. 23 is finished. Note that, when the mixing ratio, $w_A$, $w_B$ and $w_C$, is obtained, it becomes possible to correct the input color assuming the mixed light source by the method which has been already explained with reference to FIG. 19.

$$w_A = 1 - \frac{J^{\#1}}{J^{ALL}}$$
$$w_B = 1 - \frac{J^{\#2}}{J^{ALL}}$$
$$w_C = 1 - \frac{J^{\#3}}{J^{ALL}}$$
(30)

In the above, the third embodiment has been explained.

Note that, a variation example which modifies the number of reference colors, the number of light sources, the expression method of the color space, or the like, as needed, is also included in the technical ranges of the above embodiments. Further, the embodiments could be applied to a terminal apparatus such as a smart phone and a mobile phone, an information processing apparatus such as a personal computer and a server, an imaging apparatus such as a digital camera, a printer, a copy machine, a display apparatus, or the like. Obviously, such application examples are also included in the technical ranges of the above embodiments. Further, while the RGB space is illustrated as the color space in the above explanation, the techniques of the above embodiments are also applicable to the HSV space and the YUV space.

According to the disclosed apparatus and method, it becomes possible to identify a light source in imaging from a captured image.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:
1. An image processing apparatus, comprising:
    a memory configured to store information sets each relating to positional relationships between color coordinates corresponding to a plurality of reference colors under a light source among a plurality of predetermined light sources, wherein the plurality of reference colors are set in a color space, and the information sets respectively correspond to the plurality of predetermined light sources; and
    a processor configured to detect color coordinates of the plurality of reference colors from an object image, and to identify a light source used in capturing of the object image, based on a similarity between positional relationships of the detected color coordinates and the positional relationships of color coordinates specified by each of the information sets in the memory.

2. The image processing apparatus according to claim 1, wherein, each of the information sets includes information indicating differences of color coordinates between the reference colors, for a set of the reference colors including at least some of the plurality of reference colors, as the positional relationships between the color coordinates, and the processor calculates differences of color coordinates between the reference colors for the set of reference colors from the color coordinates of the reference colors detected from the object image, and identifies the light source used in capturing of the object image, based on a similarity between the calculated differences of color coordinates and the differences of color coordinates specified by the information sets in the memory.

3. The image processing apparatus according to claim 2, wherein the memory stores an adjustment value for each of the plurality of predetermined light sources used for adjustment of an error caused by a light source difference in color correction of the object image, and the processor corrects color coordinates of a color detected from the object image to obtain a correction color by interpolation processing using differences between color coordinates of the reference colors under a reference light source selected from the plurality of predetermined light sources and color coordinates of the reference colors detected from the object image, for at least some of the plurality of reference colors, and adjusts the error in the correction color using the adjustment value corresponding to the identified light source.

4. The image processing apparatus according to claim 3, wherein the processor selects information sets from the information sets in the memory, and adjusts the error of the correction color using a value obtained by adding a weight according to the similarity to the adjustment value corresponding to a light source which corresponds to each of the selected information sets.

5. The image processing apparatus according to claim 1, wherein the plurality of reference colors includes a plurality of first reference colors to be used for color correction of the object image and a second reference color to be used for determination of the light source, the memory stores color coordinates of the plurality of first reference colors under each light source which is selected from the plurality of predetermined light sources as one of reference light sources, and color coordinates of the second reference color under said each light source, and with respect to each of the reference light sources, the processor calculates color coordinates of the second reference color in the object image by interpolation processing, using differences between color coordinates of the plurality of first reference colors under said each reference light source and color coordinates of the plurality of first reference colors detected from the object image and using positional relationships of color coordinates corresponding to the plurality of first reference colors under said each reference light source and the second reference color under said each reference light source, and the processor identifies the light source used in capturing of the object image, based on a distance between the calculated color coordinates of the second reference color and the color coordinates of the second reference color corresponding to each of the reference light sources.

6. A light source identification method, comprising:

obtaining, by a computer, information sets each relating to positional relationships between color coordinates corresponding to a plurality of reference colors under a light source among a plurality of predetermined light sources, wherein the plurality of reference colors are set in a color space, and the information sets respectively correspond to the plurality of predetermined light sources; and detecting, by the computer, color coordinates of the plurality of reference colors from an object image, and identifying a light source used in capturing of the object image, based on a similarity between positional relationships of the detected color coordinates and the positional relationships of color coordinates specified by each of the information sets obtained from the memory.

7. The light source identification method according to claim 6, wherein, each of the information sets includes information indicating differences of color coordinates between the reference colors, for a set of the reference colors including at least some of the plurality of reference colors, as the positional relationships between the color coordinates, and the processor calculates differences of color coordinates between the reference colors for the set of reference colors from the color coordinates of the reference colors detected from the object image, and identifies the light source used in capturing of the object image, based on a similarity between the calculated differences of color coordinates and the differences of color coordinates specified by the information sets in the memory.

8. The light source identification method according to claim 7, wherein the memory stores an adjustment value for each of the plurality of predetermined light sources used for adjustment of an error caused by a light source difference in color correction of the object image, and the processor corrects color coordinates of a color detected from the object image to obtain a correction color by interpolation processing using differences between color coordinates of the reference colors under a reference light source selected from the plurality of predetermined light sources and color coordinates of the reference colors detected from the object image, for at least some of the plurality of reference colors, and adjusts the error in the correction color using the adjustment value corresponding to the identified light source.

9. The light source identification method according to claim 8, wherein the processor selects information sets from the information sets in the memory, and adjusts the error of the correction color using a value obtained by adding a weight according to the similarity to the adjustment value corresponding to a light source which corresponds to each of the selected information sets.

10. The light source identification method according to claim 6, wherein the plurality of reference colors includes a plurality of first reference colors to be used for color correction of the object image and a second reference color to be used for determination of the light source, the memory stores color coordinates of the plurality of first reference colors under each light source which is selected from the plurality of predetermined light sources as one of reference light sources, and color coordinates of the second reference color under said each light source, and with respect to each of the reference light sources, the processor calculates color coordinates of the second reference color in the object image by interpolation processing, using differences between color coordinates of the plurality of first reference colors under said each reference light source and color coordinates of the plurality of first reference colors detected from the object image and using positional relationships of color coordinates corresponding to of the plurality of first reference colors under said each reference light source and the second reference color under said each reference light source, and the processor identifies the light source used in capturing of the object image, based on a distance between the calculated color coordinates of the second reference color and the color coordinates of the second reference color corresponding to each of the reference light sources.

11. A non-transitory computer-readable storage medium storing a computer program that causes a computer to perform a procedure comprising:

obtaining information sets each relating to positional relationships between color coordinates corresponding to a plurality of reference colors under a light source among a plurality of predetermined light sources, wherein the plurality of reference colors are set in a color space, and the information sets respectively correspond to the plurality of predetermined light sources; and detecting color coordinates of the plurality of reference colors from an object image, and identifying a light source used in capturing of the object image, based on similarity between positional relationships of the detected color coordinates and the positional relationships of color coordinates specified by each of the information sets obtained from the memory.

* * * * *